US009330301B1

(12) United States Patent
Ozog

(10) Patent No.: US 9,330,301 B1
(45) Date of Patent: May 3, 2016

(54) SYSTEM, METHOD, AND COMPUTER PROGRAM PRODUCT FOR PERFORMING PROCESSING BASED ON OBJECT RECOGNITION

(71) Applicant: Jesse Ozog, Bethesda, MD (US)

(72) Inventor: Jesse Ozog, Bethesda, MD (US)

(73) Assignee: Ozog Media, LLC, Newark, DE (US)

( * ) Notice: Subject to any disclaimer, the term of this patent is extended or adjusted under 35 U.S.C. 154(b) by 0 days.

(21) Appl. No.: 14/582,948

(22) Filed: Dec. 24, 2014

Related U.S. Application Data

(63) Continuation-in-part of application No. 14/085,832, filed on Nov. 21, 2013.

(60) Provisional application No. 61/784,109, filed on Mar. 14, 2013, provisional application No. 61/759,816, filed on Feb. 1, 2013, provisional application No. 61/731,462, filed on Nov. 29, 2012, provisional application No. 61/729,259, filed on Nov. 21, 2012.

(51) Int. Cl.
| | |
|---|---|
| *G06F 3/048* | (2013.01) |
| *G06K 9/00* | (2006.01) |
| *G06K 9/66* | (2006.01) |
| *G06F 17/30* | (2006.01) |
| *G06F 3/0481* | (2013.01) |
| *G06K 9/68* | (2006.01) |

(52) U.S. Cl.
CPC ........ *G06K 9/00288* (2013.01); *G06K 9/00221* (2013.01); *G06K 9/00295* (2013.01); *G06K 9/66* (2013.01); *G06F 3/0481* (2013.01); *G06F 17/30244* (2013.01); *G06F 17/30247* (2013.01); *G06K 9/68* (2013.01)

(58) Field of Classification Search
CPC .......... G06K 9/00295; G06K 9/00221; G06K 9/00288; G06K 9/68; G06K 9/0029; G06K 9/665; G06F 17/30244; G06F 17/30247; G06F 3/0481
USPC ........................................................ 715/764
See application file for complete search history.

(56) References Cited

U.S. PATENT DOCUMENTS

| | | | |
|---|---|---|---|
| 6,222,939 B1 | 4/2001 | Wiskott et al. |
| 6,272,231 B1 | 8/2001 | Maurer et al. |
| 6,301,370 B1 | 10/2001 | Steffens et al. |
| 6,356,659 B1 | 3/2002 | Wiskott et al. |
| 6,466,695 B1 | 10/2002 | Potzsch et al. |

(Continued)

OTHER PUBLICATIONS https://en.wikipedia.org/wiki/Picasa#Face_recognition.
(Continued)

*Primary Examiner* — Patrick Riegler
(74) *Attorney, Agent, or Firm* — Patrick E. Caldwell, Esq.; The Caldwell Firm, LLC

(57) ABSTRACT

A system, method, and computer program product are provided for providing suggestions based on object recognition. In operation, a plurality of suggested identifiers is displayed based on facial recognition, utilizing a touchscreen of a mobile device. Additionally, a user input is received in connection with at least one of the suggested identifiers, utilizing the touchscreen of the mobile device. Further, after receiving the user input in connection with the at least one suggested identifier, a correspondence is created between the at least one suggested identifier and at least one aspect of a face, utilizing the at least one processor of the mobile device.

20 Claims, 11 Drawing Sheets

(56) References Cited

U.S. PATENT DOCUMENTS

| | | | |
|---|---|---|---|
| 6,563,950 | B1 | 5/2003 | Wiskott et al. |
| 6,580,811 | B2 | 6/2003 | Maurer et al. |
| 6,714,661 | B2 | 3/2004 | Buddenmeier et al. |
| 6,940,545 | B1* | 9/2005 | Ray et al. .................... 348/222.1 |
| 8,224,824 | B2 | 7/2012 | Tsukagoshi et al. |
| 8,386,620 | B2 | 2/2013 | Chatterjee |
| 8,798,401 | B1 | 8/2014 | Johnson et al. |
| 8,861,804 | B1* | 10/2014 | Johnson ............. G06K 9/00221 382/118 |
| 2003/0210808 | A1* | 11/2003 | Chen et al. .................... 382/118 |
| 2009/0037477 | A1* | 2/2009 | Choi et al. ................. 707/104.1 |
| 2010/0066822 | A1* | 3/2010 | Steinberg et al. ............... 348/77 |
| 2011/0034176 | A1* | 2/2011 | Lord ................. G06F 17/30244 455/450 |
| 2011/0212717 | A1* | 9/2011 | Rhoads ............. G06F 17/30241 455/420 |
| 2012/0086792 | A1 | 4/2012 | Akbarzadeh et al. |
| 2012/0151398 | A1* | 6/2012 | Foy et al. ....................... 715/769 |
| 2012/0230539 | A1* | 9/2012 | Calman ................. G06Q 50/01 382/103 |
| 2013/0156274 | A1* | 6/2013 | Buchmueller et al. ........ 382/118 |
| 2013/0194438 | A1 | 8/2013 | Sweet, III et al. |
| 2013/0262588 | A1* | 10/2013 | Barak et al. .................... 709/204 |
| 2014/0096041 | A1* | 4/2014 | Gowen et al. ................. 715/753 |
| 2014/0122592 | A1 | 5/2014 | Houston et al. |
| 2014/0304269 | A1 | 10/2014 | Kiyohara et al. |

OTHER PUBLICATIONS http://www.searchenginejournal.com/google-neven-vision-image-recognition/3728/.

http://www.macworld.com/article/2049356/how-to-use-iphotos-faces-and-places-features.html, Christopher Breen, Sep. 26, 2013, last accessed Jul. 10, 2015.

https://itunes.apple.com/us/app/face%20match%20face%20recognition/id310972844?mt=8, "Face Match—Face Recognition by PBF," Jul. 13, 2010, last accessed Jul. 10, 2015.

https://support.google.com/picasa/answer/156347?hl=en&rd=1, "Picasa and Picasa Web Albums Help," Apr. 2013, last accessed Jul. 10, 2015.

* cited by examiner

SYSTEM, METHOD, AND COMPUTER PROGRAM PRODUCT FOR PERFORMING PROCESSING BASED ON OBJECT RECOGNITION

RELATED APPLICATIONS

The present application is a continuation-in-part of U.S. patent application Ser. No. 14/085,832, Titled "SYSTEM, METHOD, AND COMPUTER PROGRAM PRODUCT FOR SHARING METADATA ASSOCIATED WITH A MEDIA OBJECT," filed Nov. 21, 2013, which claims priority to previously filed U.S. Patent Application No. 61/729,259, Titled "SYSTEM, METHOD, AND COMPUTER PROGRAM PRODUCT FOR SHARING METADATA ASSOCIATED WITH A MEDIA OBJECT," filed Nov. 21, 2012, U.S. Patent Application No. 61/731,462, Titled "SYSTEM, METHOD, AND COMPUTER PROGRAM PRODUCT FOR UPDATING DIRECTIONS BASED ON A CHANGE IN LOCATION," filed Nov. 29, 2012, U.S. Patent Application No. 61/759,816, Titled "SYSTEM, METHOD, AND COMPUTER PROGRAM PRODUCT FOR SHARING METADATA ASSOCIATED WITH A MEDIA OBJECT," filed Feb. 1, 2013, U.S. Patent Application No. 61/784,109, Titled "SYSTEM, METHOD, AND COMPUTER PROGRAM PRODUCT FOR SHARING METADATA ASSOCIATED WITH A MEDIA OBJECT," filed Mar. 14, 2013, all of which are incorporated herein by reference in their entirety.

FIELD OF THE INVENTION AND BACKGROUND

The present invention relates to object recognition, and more particularly to performing processing based on object recognition.

SUMMARY

A system, method, and computer program product are provided for providing suggestions based on object recognition. In operation, a plurality of suggested identifiers is displayed based on facial recognition, utilizing a touchscreen of a mobile device. Additionally, a user input is received in connection with at least one of the suggested identifiers, utilizing the touchscreen of the mobile device. Further, after receiving the user input in connection with the at least one suggested identifier, a correspondence is created between the at least one suggested identifier and at least one aspect of a face, utilizing the at least one processor of the mobile device.

DETAILED DESCRIPTION

Glossary media object=one or more images, photos, pictures, videos, applications, audio files, text, binary information, and/or data including files associated therewith.

metadata=data and/or information associated with a media object.

third party input=information associated with a face and/or an object which may be used for identification.

identifier=graphical or textual representation for identifying a face, metadata, and/or an object.

correspondence=a correlation between at least one identifier and at least one aspect of a face or an object.

aggregate metadata=metadata used in combination with additional metadata associated with another user.

bucket=an age classification applied to a face or an object.

Figure 1:
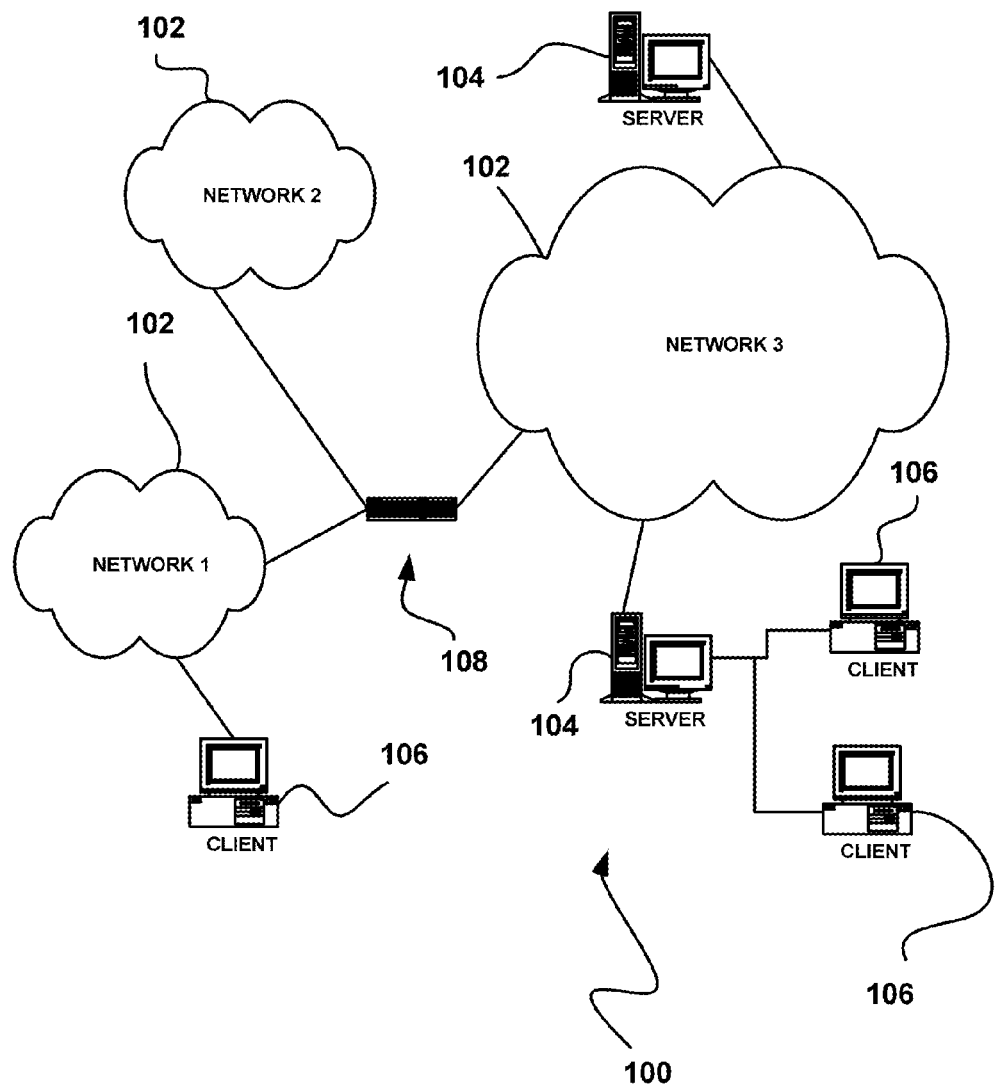
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween. In the context of the present description, cloud refers to one or more servers, services, and/or resources which are located remotely.

Figure 2:
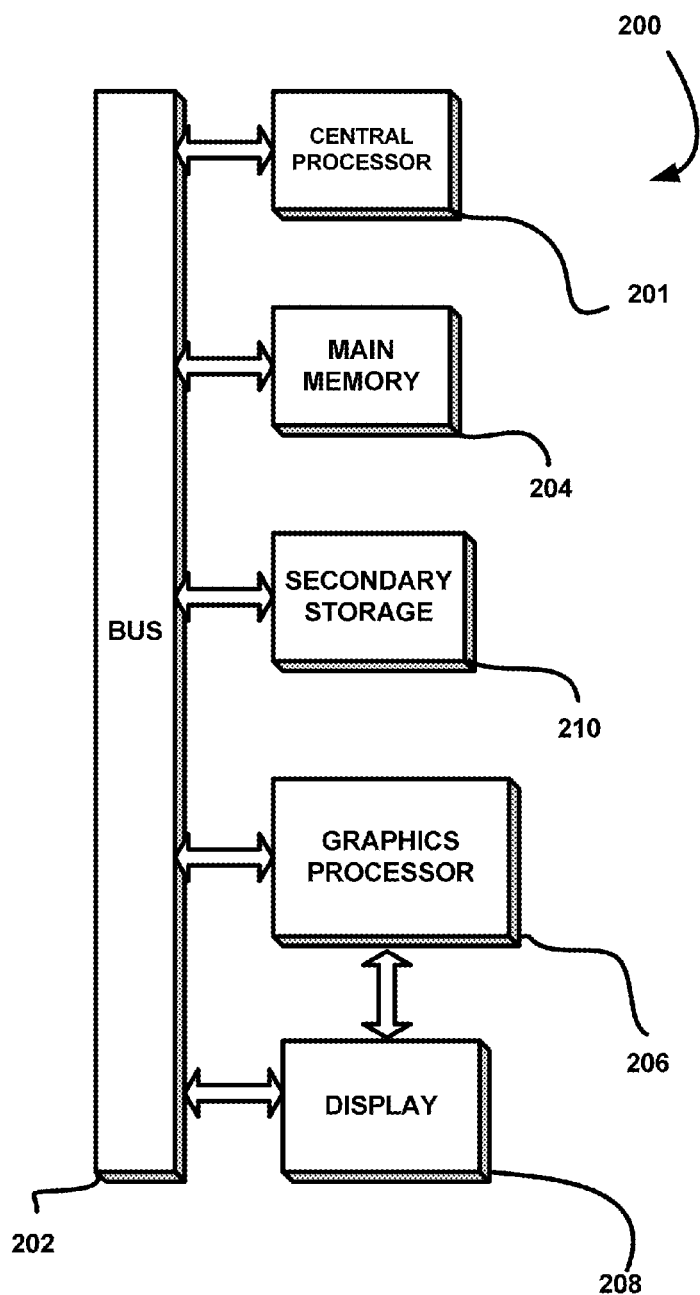
FIG. 2 illustrates an exemplary system in which the various architecture and/or functionality of the previous embodiment and/or subsequent embodiments may be implemented.

FIG. 2 illustrates an exemplary system 200 in which the various architecture and/or functionality of the previous embodiment and/or subsequent embodiments may be implemented. As shown, a system 200 is provided including at least one host processor 201 which is connected to a communication bus 202. The system 200 also includes a main memory 204. Control logic (software) and data are stored in the main memory 204 which may take the form of random access memory (RAM).

The system 200 also includes a graphics processor 206 and a display 208, i.e. a computer monitor. In one embodiment, the graphics processor 206 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 200 may also include a secondary storage 210. The secondary storage 210 includes, for example, at least one of a non-volatile memory (e.g. flash memory, magnetoresistive memory, ferroelectric memory, etc.), a hard disk drive, and a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions. The main memory 204, the secondary storage 210 and/or any other storage are possible examples of computer-readable media.

In one embodiment, the architecture and/or functionality of the various previous figures may be implemented in the context of the host processor 201, graphics processor 206, an integrated circuit (not shown) that is capable of at least a portion of the capabilities of both the host processor 201 and the graphics processor 206, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 200 may take the form of a desktop computer, a laptop computer, a server computer, and/or any other type of logic. Still yet, the system 200 may take the form of various other devices including, but not limited to, a personal digital assistant (PDA) device, a mobile device, a tablet device, a television, etc. In the context of the present description, a mobile device may include any portable computing device, including but not limited to, a laptop computer, a tablet computer, a desktop computer, a mobile phone, a media player, a camera, a television, and/or any other portable computing device.

Further, while not shown, the system 200 may be coupled to a network [e.g. a telecommunications network, local area network (LAN), wireless network, wide area network (WAN) such as the Internet, peer-to-peer network, cable network, etc.] for communication purposes.

Of course, the various embodiments set forth herein may be implemented utilizing hardware, software, or any desired combination thereof. For that matter, any type of logic may be utilized which is capable of implementing the various functionality set forth herein.

Figure 3A:
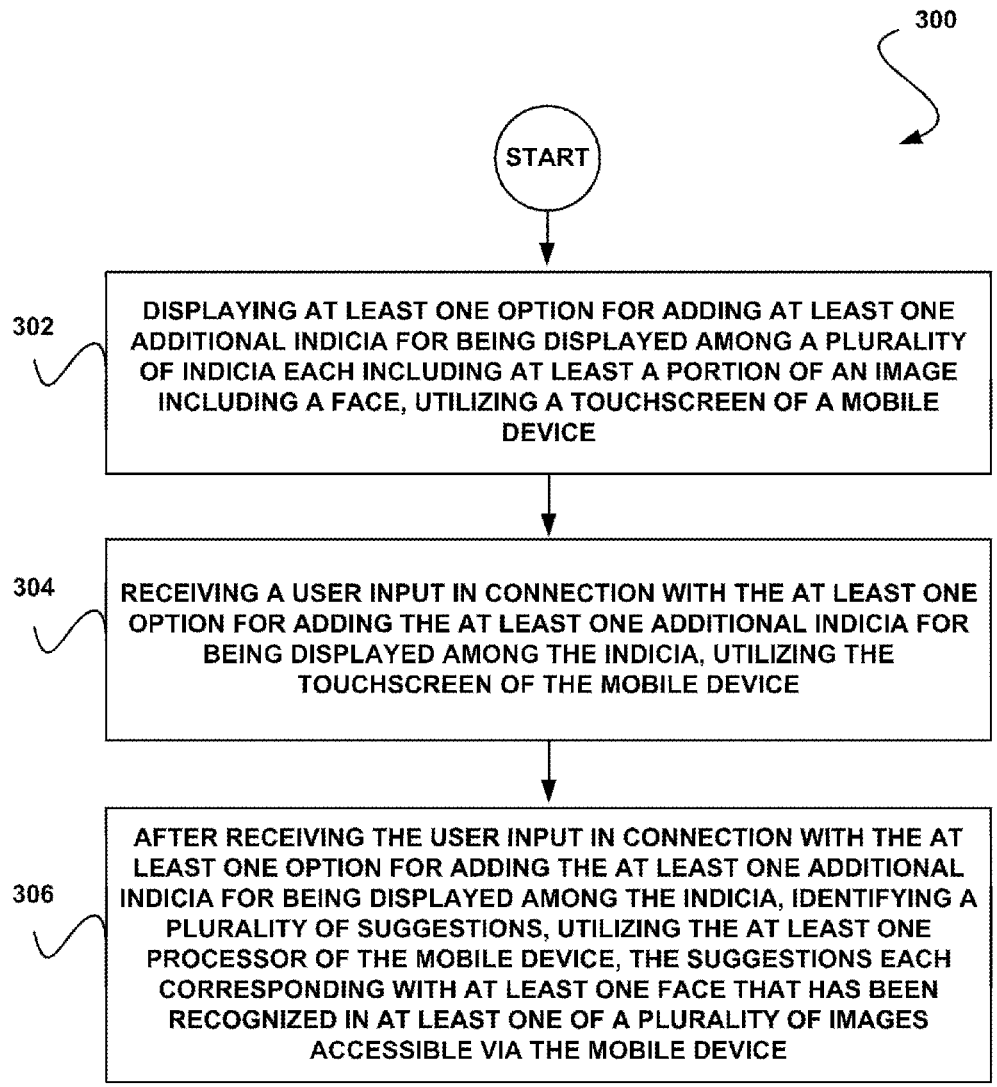
FIG. 3A shows a method for providing suggestions based on object recognition, in accordance with one embodiment.

FIG. 3A shows a method 300 for providing suggestions based on object recognition, in accordance with one embodiment. As an option, the method 300 may be implemented in the context of the architecture and environment of the previous figures and/or any subsequent figures. Of course, however, the method 300 may be carried out in any desired environment.

As shown, at least one option is displayed, utilizing a touchscreen of a mobile device, for adding at least one additional indicia among a plurality of indicia each including at least a portion of an image including a face. See operation 302. Additionally, a user input is received in connection with the at least one option, utilizing the touchscreen of the mobile device. See operation 304. Furthermore, after receiving the user input in connection with the at least one option, a plurality of suggestions is identified, utilizing the at least one processor of the mobile device. Such suggestions each correspond with at least one face that has been recognized in at least one of a plurality of images accessible via the mobile device. See operation 304.

In the context of the present description, indicia may include any visible interface element associated with a face and/or object. For example, in various embodiment, indicia may include one or more faces (and/or objects), one or more textual identifiers (e.g. name, group, geographic location, etc.) associated with one or more faces or objects, one or more signs (e.g. plus sign to add, minus sign to delete, etc.), one or more indicated tokens (e.g. permission to add information, voucher to exchange for coupon for the object, connection request to the face, etc.), one or more actions (e.g. "find more information about [object]/[face]", print face/object, share face/object, conduct Internet search on face/object, etc.), one or more input options (e.g. receive input via touch, receive command via voice, receive input via external mouse, etc.), and/or any other indication and/or mark used to distinguish a face and/or an object. Of course, the above may also apply to additional indicia, and/or any other type of indicia associated with a face and/or object.

Additionally, in one embodiment, object recognition may apply in lieu or in addition to facial recognition. For purposes of this description, therefore, when facial or object recognition is described anywhere in the current disclosure, it may be applied to either facial or object recognition or a combination of both. For example, a photo may include both faces and objects. In one embodiment, a face may include indicia indicating a name of the individual associated with the face, and an object may include indicia including a link to find out further information about the object (e.g. discover related objects, find more details about the object, print, share, etc.). Of course, any number of faces and/or objects may be identified.

In other embodiments, facial and/or object recognition may occur in real-time. For example, in one embodiment, faces and objects may be recognized (and indicia displayed) as part of a video feed (e.g. home digital camera system, Skype, Google Hangouts, etc.). As the video records, information associated with the faces and objects may also be displayed on a screen associated with the video feed system. In one embodiment, information displayed may be saved in a file separate from the video file (e.g. as metadata appended to the video file, etc.). Further, the information saved in a separate file may be manipulated in some manner (e.g. change a displayed name or object, upload information identified to central server, etc.) after real-time.

Of course, in such embodiments, real-time processing may be applied to any media object, which may include any type of media and/or portion of media. For example, in various embodiments, the media object may include one or more images, videos, applications, audio, text, binary information, and/or data.

In further embodiments, facial and/or object recognition may occur in non-real-time. For example, in one embodiment, faces and objects may be recognized (and indicia displayed) as part of a post-processing process (e.g. on a camera after recording is complete, on a computer system, on a mobile device system, etc.).

Additionally, metadata associated with the media object may also be created and stored (e.g. with the media object file, as a file separate from the media object file, etc.). In one embodiment, metadata may include any data associated with the media object. For example, in one embodiment, the metadata may include at least one filter or a component thereof. In various embodiments, the filter may include one or more filters for filtering media objects or components thereof, and/or filter information for performing filtering functions associated with media objects. In one embodiment, a filter associated with an image may be created by selecting one or more faces in an image or one or more objects in an image. Additionally, in one embodiment, the filter may include metadata associated with the image, such as a group association, a time associated with the image, a location associated with the image, people associated with the image, a quality of the image, a rating associated with the image, and/or various other information.

In another embodiment, indicia may be displayed among at least a portion of an image. For example, indicia may be displayed for a face and/or an object, to a grouping of faces and/or objects, to a section or portion of an image, or even to the entire image itself. By way of illustration, an image may include one face, one object (e.g. an umbrella), and the image background. Indicia associated with the face may include a name of the individual, displayed directly below the face, and the umbrella may include a link to buy the umbrella, displayed directly below the object. Further, indicia associated with the image background may include text (e.g. displayed next to the object, etc.) indicating the location of the image background (e.g. "Grant's Tomb", etc.). Further, indicia associated with the entire image (e.g. "image information", etc.) may include an option to display further indicia (e.g. time of when the photo was taken, GPS coordinates of where the photo was taken, who took the photo, where the photo is saved, a link to find other related photos, etc.).

In some embodiments, indicia associated with the recognized object(s) and/or face(s) may be associated with a ceiling. For example, if the number of recognized object(s) and/or face(s) exceeds a set number (e.g. based on the amount of space available on the image, etc.), then a maximum amount of indicia may be displayed. In other embodiments, the number of indicia displayed may be restricted based off of user input (e.g. do not restrict more than 5% of the image, etc.). Further, the indicia may be associated with a timer (e.g. display for 5 seconds and then disappear, etc.), which may be additionally set by the user.

In some embodiments, if the indicia are restricted, a hierarchy of displayed indicia may be imposed. For instance, a ceiling of 6 displayed indicia may be set by the user, but the number of objects and/or faces may include 10 objects/faces. In such a situation, the indicia displayed may be based on the first 6 objects/faces detected, a preference (e.g. as set by the user, as set by an automatic setting, etc.) to display faces before objects, may be based on the degree of connections (i.e. lower degree has higher preference to be displayed, etc.) between the individual of the device and the detected individual's face (e.g. direct connection, a friend of a friend connection, a public connection, etc.), may be based on group associations (e.g. group more than face and/or object if they can be grouped, etc.) used to consolidate identified items, and/or may apply any other input and/or setting whereby a hierarchy among the identified faces/objects may occur. In other embodiments, indicia may be restricted based on a white list (e.g. users whom you want to display information about, etc.) and/or black list (e.g. users whom you do not wish to display any information about, etc.).

In one embodiment, metadata may be associated with a media object. In various embodiments, the metadata may include information associated with the capture of the media object (e.g. GPS coordinates of location, individual who captured the image, etc.), information identified apart from the capture of the image (e.g. identification of faces, identification of objects, etc.), as well as information corrected and/or inputted by the user.

In another embodiment, the metadata may include location information. For example, in one embodiment, the metadata may include information associated with a location the media object was created, modified, last accessed, and/or captured, etc. In another embodiment, the metadata may include time information. For example, in one embodiment, the metadata may include information associated with a time the media object was created, modified, last accessed, and/or captured, etc.

In another embodiment, the metadata may include information associated with the originator of the media object. In various embodiments, the originator information may include an originator name, alias, location, contact information, and/or other information. In another embodiment, the metadata may include relationship information. For example, in one embodiment, the relationship information may include relationship information between the first user and the second user, etc. In various embodiments, the relationship information may include information associated with people present in an image.

In one embodiment, user input may include any type of input associated with the user, including but not limited to, a voice command, a touch input (e.g. via a touchscreen, etc.), an external peripheral device (e.g. a mouse, keyboard, etc.), etc. In one embodiment, the user input may be used to initiate an action. For example, in one embodiment, touching and holding a face of an image may cause additional indicia to be displayed, including, for example, the ability to edit suggested name, edit contact information, adjust hierarchy of displayed indicia, look up identified face/object, contact the suggested name, and/or take any other action relating directly to the associated face. Of course, in other embodiments, a threshold may be used to determine which object the input may be associated with. For example, in one embodiment, if the input is within a set distance (e.g. 2 cm, etc.) of an identified object or face, it may be assumed that the input corresponds with the identified object or face. In another embodiment, if the input could be associated with more than one identified object or face (e.g. based off of the threshold), the object or face to which the input is closest may be assumed to be the intended object or face. Of course, any other technique which may be used by one skilled in the art may be used to determine the relevancy of an input to an identified object or face.

In some embodiments, an object or face may not be previously identified (i.e. no suggestion is associated with the face or object, etc.). Therefore, no suggested name or information may be associated with the face or object. In such an embodiment, an input may occur (e.g. via a user input on the touchscreen, etc.), and although the intended object had not been previously identified, it may still be selected (e.g. boundary detection, etc.) and manually identified by the user. In this manner, previously unidentified objects or faces may be identified and/or an action may be taken to the selected object or face.

In another embodiment, identifying one or more suggestions may include displaying text associated with an object or face, displaying an additional object (e.g. an input box, a graphic, etc.), displaying an overlay (e.g. with 50% transparency, etc.), and/or any object which may be associated with the object or face. In one embodiment, identifying one or more suggestions may occur automatically (e.g. in response to identifying one or more objects/faces, etc.), or may occur manually (e.g. based on user input, based on user training the device, etc.). In other embodiments, identifying one or more suggestions may occur based on group feedback (e.g. via sharing, via social media, etc.).

For purposes of the present description, the indicia and suggestions are described as being displayed via a mobile device (e.g. smart phone, tablet, portable computer, etc.). However, the indicia and suggestions may likewise be displayed (and manipulated as necessary) using a desktop computer system or any other non-mobile computer system. In one embodiment, indicia and suggestion may relate to a displayed image. In other embodiments, indicia and suggestions may relate to a displayed image and to other available images (e.g. stored on the device, accessible in the cloud, etc.).

Figure 3B:
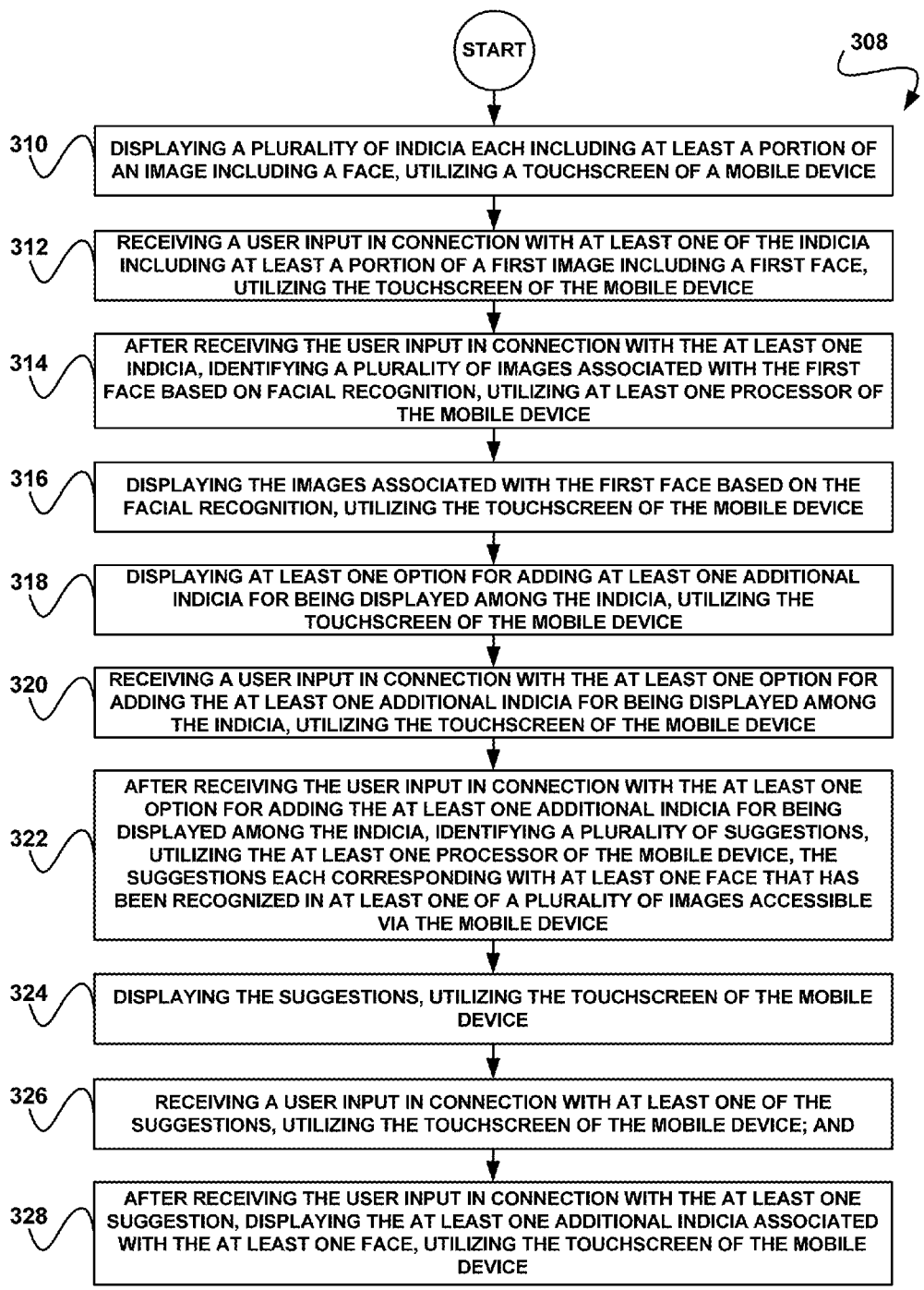
FIG. 3B shows a method for providing suggestions based on object recognition, in accordance with one embodiment.

FIG. 3B shows a method 308 for providing suggestions based on object recognition, in accordance with one embodiment. As an option, the method 308 may be implemented in the context of the architecture and environment of the previous figures and/or any subsequent figures. Of course, however, the method 308 may be carried out in any desired environment.

As shown, a plurality of indicia is displayed, utilizing a touchscreen of a mobile device. Each indicia includes at least a portion of an image including a face. See operation 310. Additionally, a user input is received in connection with at least one of the indicia, utilizing the touchscreen of the mobile device. See operation 312. Further, after receiving the user input in connection with the at least one indicia, a plurality of images associated with the first face is identified based on facial recognition, utilizing at least one processor of the mobile device. See operation 314. Moreover, the images associated with the first face are displayed based on the facial recognition, utilizing the touchscreen of the mobile device. See operation 316.

Additionally, as shown, at least one option for adding at least one additional indicia for being displayed among the indicia is displayed, utilizing the touchscreen of the mobile device. See operation 318. Additionally, a user input is received in connection with the at least one option, utilizing the touchscreen of the mobile device. See operation 320. Still yet, after receiving the user input in connection with the at least one option for, a plurality of suggestions is identified, utilizing the at least one processor of the mobile device. The suggestions each correspond with at least one face that has been recognized in at least one of a plurality of images accessible via the mobile device. See operation 322.

In various embodiments, at least one additional indicia may include at least one face and/or a textual identifier associated with the at least one face. For example, in one embodiment, a photo may include a first person, and additional indicia may include a representative face displayed below the first person which is associated with the first person. Additionally, in another embodiment, a name or identification of the identified face may also be displayed below (or in any position around) the face. Of course, in other embodiments, detection, identification, and suggestions associated with objects in lieu of one or more faces may also occur.

In another embodiment, an option being displayed among the indicia may include ability to send the object and/or face, to identify the object and/or face, to share the image and/or media object, to control a privacy setting associated with the object and/or face, to assign an age of the detected object/face, and/or any other feature associated with the object and/or face. In one embodiment, an option may be displayed after tapping (and/or holding) on a face and/or object. In another embodiment, an option may be displayed in response to a gesture (e.g. shake the device, etc.). In one embodiment, user input may be received in connection with the at least one indicia as a result of detecting a touch within a predetermined proximity to the at least one indicia displayed utilizing the touchscreen of the mobile device. In one embodiment, touch may be received from any source, including a user's finger, a stylus, and/or any other input.

Further, as shown, the suggestions are displayed, utilizing the touchscreen of the mobile device. See operation 324. Additionally, a user input is received in connection with at least one of the suggestions, utilizing the touchscreen of the mobile device. See operation 326. Lastly, after receiving the user input in connection with the at least one suggestion, the at least one additional indicia associated with the at least one face is displayed, utilizing the touchscreen of the mobile device.

In various embodiments, suggestions may each include a corresponding face and/or a textual identifier associated with a corresponding face. Of course, in other embodiments, suggestions may include any graphic and/or text associated with a face and/or object. In a separate embodiment, suggestions may be displayed utilizing a scroll menu, a drop-down menu, a hover pane, etc. Additionally, the suggestions may be prioritized based on, but not limited to, facial recognition confidence (e.g. confidence level, etc.), image location metadata (e.g. based on GPS coordinates, based on other devices nearby, etc.), degree of connections (e.g. between you and the identified face, etc.), time since last contact with the identified face (e.g. the greater the amount of time, the less relevant it may be, etc.), a number of relevant hits (e.g. based on group feedback identifying the face, etc.), a grouping of individuals (e.g. family members may be considered more relevant, etc.), a list of allowed or rejected individuals (e.g. whitelist, blacklist, etc.), and/or any other information which may be used to prioritize the suggestions in some manner.

In one embodiment, the suggestions may each correspond with at least one face that has been recognized in at least one of the images accessible via the mobile device, utilizing face recognition information based on input of a user of the mobile device. For example, in one embodiment, a suggestion may not be displayed unless the face has already previously been identified in another image. In another embodiment, if a face has not been previously identified, the user may select to input new information associated with the new face, which may thereafter be used as a basis for potential suggestions.

Additionally, in another embodiment, the face recognition information based on the input of the user of the mobile device may be received after receiving a user input in connection with the at least one other option displayed, utilizing the touchscreen of the mobile device. For example, in one embodiment, a user may indicate a birth date associated with a face displayed in the photo, which may allow the profile associated with the face to be created and/or updated accordingly. Of course, other information associated with date (e.g. day/month/year information, etc.) may be determined automatically (e.g. from metadata associated with the image, etc.).

Still yet, in one embodiment, the suggestions may each correspond with at least one face that has been recognized in at least one of the images accessible via the mobile device, utilizing face recognition information, which may additionally be based on third party input received at the mobile device. In one embodiment, face recognition information associated with a third party input may include any information associated with a face and/or object which may be used for identification. For example, face recognition information associated with a third party input may include metadata associated with images on a social networking site, training information (e.g. identifying faces and/or objects, etc.) completed and shared with you by a contact, publicly accessible information (e.g. images designated as public which may be used to assist in facial identification, etc.), etc. Additionally, face recognition information associated with a third party input may be received based on a relation between a user of the mobile device and a third party associated with the third party input.

In a separate embodiment, at least one image may be accessible via the mobile device by being stored in memory of the mobile device. In other embodiments, at least one image may be accessible via the mobile device by being received over a network interface of the mobile device.

In another embodiment, a user input may be received in connection with the at least one additional indicia, utilizing the touchscreen of the mobile device. After receiving the user input in connection with the at least one additional indicia, a plurality of particular images associated with the at least one face may be identified based on the facial recognition, utilizing at least one processor of the mobile device. Still yet, the particular images associated with the first face may be displayed based on the facial recognition, utilizing the touchscreen of the mobile device.

Figure 4A:
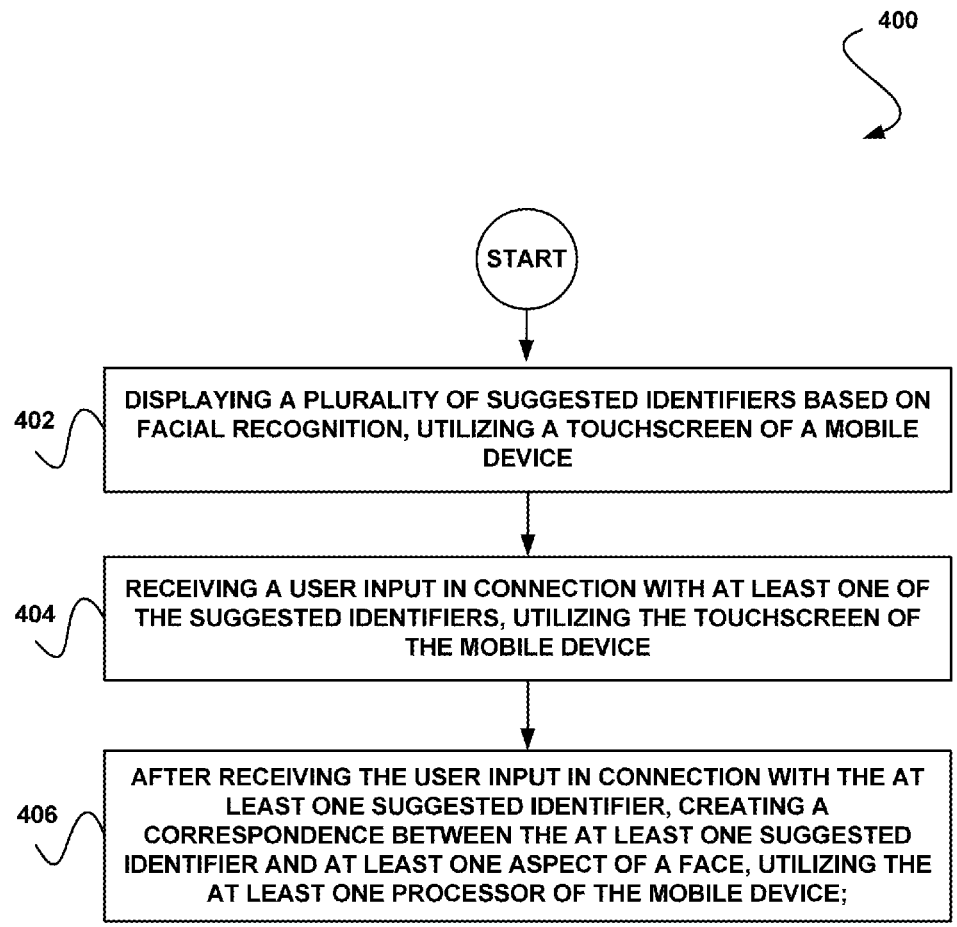
FIG. 4A shows a method for providing suggestions based on object recognition, in accordance with one embodiment.

FIG. 4A shows a method 400 for providing suggestions based on object recognition, in accordance with one embodiment. As an option, the method 400 may be implemented in the context of the architecture and environment of the previous figures and/or any subsequent figures. Of course, however, the method 400 may be carried out in any desired environment.

As shown, a plurality of suggested identifiers is displayed based on facial recognition, utilizing a touchscreen of a mobile device. See operation 402. Additionally, a user input is received in connection with at least one of the suggested identifiers, utilizing the touchscreen of the mobile device. See operation 404. Further, after receiving the user input in connection with the at least one suggested identifier, a correspondence is created between the at least one suggested identifier and at least one aspect of a face, utilizing the at least one processor of the mobile device. See operation 406.

In one embodiment, identifiers may include any graphical or textual representation used to identify in some manner an object and/or face. For example, in various embodiments, identifiers may include text associated with an object or face, displaying an additional object (e.g. an input box, a graphic, etc.), an overlay (e.g. with 50% transparency, etc.), and/or any object which may be associated with the object or face. In one embodiment, identifiers may occur automatically (e.g. in response to identifying one or more objects/faces, etc.), or may occur manually (e.g. based on user input, based on user training the device, etc.). Of course, in one embodiment, identifiers may be used in lieu of suggestions, as heretofore discussed.

In another embodiment, a correspondence may include any correlation between the at least one suggested identifier and at least one aspect of a face. For example, in various embodiments, the correspondence may include metadata which may describe the context of correlation (e.g. time or date of correlation, location of correlation, age of individual, etc.), a linkage therebetween, at least one database entry, and/or correlation-related content (e.g. facial/object features and/or distinguishing mark/shape/etc., etc.). In some embodiments, a correspondence may be saved as part of the media object file, whereas in other embodiments, a correspondence may remain a separate file stored apart from the media object file.

Figure 4B:
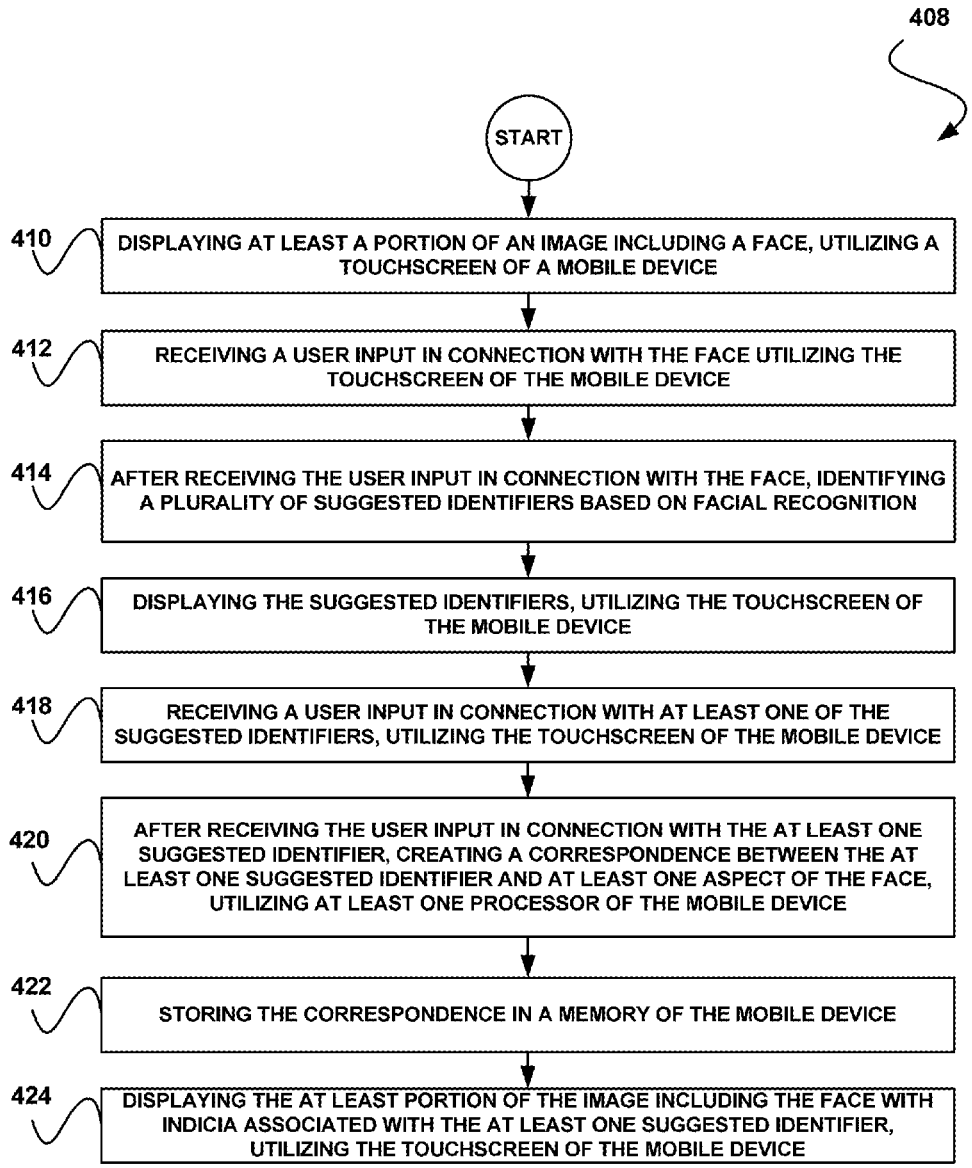
FIG. 4B shows a method for providing suggestions based on object recognition, in accordance with one embodiment.

FIG. 4B shows a method 408 for providing suggestions based on object recognition, in accordance with one embodiment. As an option, the method 408 may be implemented in the context of the architecture and environment of the previous figures and/or any subsequent figures. Of course, however, the method 408 may be carried out in any desired environment.

As shown, at least a portion of an image including a face is displayed, utilizing a touchscreen of a mobile device. See operation 410. Additionally, a user input is received in connection with the face, utilizing the touchscreen of the mobile device. See operation 412. Still yet, after receiving the user input in connection with the face, a plurality of suggested identifiers is identified based on facial recognition. See operation 414.

In one embodiment, the suggested identifiers may be based on facial recognition. This may, for example, be accomplished by being identified based on a facial recognition result in connection with the face and facial recognition results involving a plurality of other faces corresponding to the suggested identifiers. For example, in one embodiment, a face may be analyzed and several suggested corresponding faces may be displayed which may be possible matches to the analyzed face.

In another embodiment, the suggested identifiers may be prioritized based on a confidence level associated with facial recognition results involving a plurality of other faces corresponding to the suggested identifiers. For example, in one embodiment, the confidence level may be based on a match of characteristics between an analyzed face and potential matches. Additionally, in other embodiments, the confidence level may be influenced based on the frequency of correct matches (e.g. for a frequently analyzed face, a face with a very distinct scar may have a higher confidence level than a face without any easily distinguished marks, etc.), based on the input from a threshold number of users (e.g. if more than 100 people confirm the identity of a face, such a face may have a higher confidence level, etc.), based on the percentage of overlapping characteristics (e.g. eye position/shape, eyebrow position/shape, hair length/color, cheekbone position/shape, jaw position/shape, ear position/shape, etc.), and/or any other characteristics which may be used to influence the confidence level in some way. Further, in one embodiment, the suggested identifiers may be prioritized by ordering the same (e.g. based on confidence level, based on name, based on relevance, etc.).

Additionally, the confidence level may be based on degree of connections (e.g. between you and the identified face, etc.), time since last contact with the identified face (e.g. the greater the amount of time, the less relevant it may be, etc.), a location (e.g. between the face's location and previously identified locations for the face), a number of relevant hits (e.g. based on group feedback identifying the face, etc.), a grouping of individuals (e.g. family members may be considered more relevant, etc.), a list of allowed or rejected individuals (e.g. whitelist, blacklist, etc.), and/or any other information which may be used to prioritize the suggestions in some manner.

In another embodiment, the confidence level may be set by the user when identifying a face and/or an object. For example, in one embodiment, a face may be detected in an image, but a correlation with an individual cannot be made. In such an embodiment, the user may identify the individual and select a confidence level associated with the identification.

Additionally, as shown, the suggested identifiers are displayed, utilizing the touchscreen of the mobile device. See operation 416. Moreover, a user input is received in connection with at least one of the suggested identifiers, utilizing the touchscreen of the mobile device. See operation 418. Additionally, after receiving the user input in connection with the at least one suggested identifier, a correspondence is created between the at least one suggested identifier and at least one aspect of the face, utilizing at least one processor of the mobile device. See operation 420. Still yet, the correspondence is stored in a memory of the mobile device. See operation 422. Lastly, the at least portion of the image including the face with indicia associated with the at least one suggested identifier, is displayed, utilizing the touchscreen of the mobile device. See operation 424.

In one embodiment, the suggested identifiers may be displayed utilizing a scrolling menu, a drop-down menu, a hover pane, etc. Additionally, in another embodiment, the suggested identifiers may be displayed with a plurality of other faces corresponding to the suggested identifiers. Still yet, in one embodiment, the plurality of suggested identifiers may be also based on contact identifiers stored in a contact database stored in the memory of the mobile device.

In another embodiment, at least a portion of the image including the face may be displayed after a user input in connection with a training icon displayed in connection with a home screen. Such home screen may include a plurality of face icons each representative of at least one corresponding face for accessing images including the at least one corresponding face included therein. For example, in one embodiment, a user may input information relating to an individual's face (e.g. name, age, location, etc.), and such a face may be saved as a representation of the individual, and may be displayed as a suggestion thereafter if applicable to the detected faces/objects in the image.

Additionally, in a separate embodiment, the user input in connection with the face may include an initial touch input in connection with the face utilizing the touchscreen of the mobile device, and a subsequent entry of at least one character for use in filtering the suggested identifiers that are displayed. For example, in one embodiment, a user may input a first letter "S" and the suggestions will filter such that only names which begin with S will be displayed. As the user continues to input further letters (e.g. "SA," then "SAS," then "SASC," then "SASCH," and "SASCHA," etc.), the suggestions will re-filter such that only suggestions which include a name matching the input text will be displayed. Of course, in other embodiments, inputting text is just one way of filtering the suggested identifiers, and other filtering methods may include using one or more sensors (e.g. geographic proximity sensor, GPS sensor, etc.), WiFi (e.g. to determine devices nearby, to determine location, etc.), Bluetooth (e.g. to determine short range devices nearby, etc.), and/or any other sensor and/or method to aid in filtering the suggested identifiers.

In one embodiment, the receipt of the user input in connection with the face may include receiving a first touch input on the face utilizing the touchscreen of the mobile device, where the first touch input results in a display of a first subset of the suggested identifiers in alphabetical order and a search field. Further, after receiving the first touch input, at least one character input is capable of being received in connection with the search field utilizing the touchscreen of the mobile device. Such at least one character results in a display of a second subset of the suggested identifiers based on the at least one character. After receiving the at least one character input, a second touch input is capable of being received on at least one of the second subset of the suggested identifiers utilizing the touchscreen of the mobile device. To this end, the correspondence is created after the second touch input is received.

In another embodiment, prior to receiving the user input in connection with the face, at least portion of the image including the face may be displayed including indicia representative of at least one previous identifier. Further, the correspondence between the at least one suggested identifier and at least one aspect of the face replaces a pre-existing correspondence between the at least one previous identifier and the at least one aspect of the face.

Still yet, in one embodiment, a user input may be received in connection with another face utilizing the touchscreen of the mobile device. Such another face may have an associated particular correspondence with a particular identifier. After receiving the user input in connection with the another face, a plurality of alternate identifiers may be retrieved. Such alternate identifiers may be displayed, utilizing the touchscreen of the mobile device. Further, a user input may be received in connection with at least one of the alternate identifiers, utilizing the touchscreen of the mobile device. After receiving the user input in connection with the at least one alternate identifier, an additional correspondence may be created between the at least one alternate identifier and the at least one aspect of the face, utilizing at least one processor of the mobile device. Such additional correspondence may be stored in the memory of the mobile device. Further, the at least portion of the image may be displayed including the face with indicia associated with the at least one alternative identifier, utilizing the touchscreen of the mobile device.

In other embodiments, one or more various options may or may not be employed. For example, the user input may be received in connection with the face as a result of detecting a touch within a predetermined proximity to the face displayed utilizing the touchscreen of the mobile device. Further, user input may be received in connection with the at least one suggested identifier as a result of detecting a touch within a predetermined proximity to the at least one suggested identifier displayed utilizing the touchscreen of the mobile device. Still, the correspondence may include at least one field that correlates the at least one suggested identifier and the at least one aspect of the face. Still yet, at least one aspect of the face may include at least one of a facial identifier associated with the face, a model of the face, or a linkage to information capable of being used to perform facial recognition in connection with the face. Even still, at least one suggested identifier may include at least one of a name, a tag, or an identifier associated with a person corresponding to the face. Further, indicia may include a textual representation of the at least one suggested identifier.

As an option, metadata may be associated with a media object. In one embodiment, such metadata may include at least one rating. Further, in one embodiment, the rating may include user ratings associated with the media object. In various embodiments, the rating may include a numerical rating, a letter rating, an object rating (e.g. a star rating, a thumbs-up/thumbs-down rating, etc.), and/or various other types of ratings.

Further, in one embodiment, the media object may include a picture or video, and the metadata may include a result of a facial recognition or object recognition learning process. In this case, in one embodiment, the metadata may include a person name and/or alias. In another embodiment, the metadata may include physical description data associated with a person and/or object. In various embodiments, the physical description data may include hair color, eye color, skin color, facial feature attributes, body type, height, weight, distinguishing features, gender, length, width, contours, marks, material type, chemical composition, and/or any other physical description data.

Additionally, in one embodiment, the facial and/or object recognition learning process may be capable of being carried out by the first user in connection with a plurality of the media objects utilizing a single interface. For example, in one embodiment, a single interface may be capable of implementing a facial and/or object recognition learning process on multiple images (e.g. multiple individual images, a video including multiple images, etc.). Of course, in other embodiments, the facial and/or object recognition learning process may be capable of being carried out by a plurality of users (e.g. connected via a social network, single file cloud hosted and accessed by multiple users, etc.).

In one embodiment, the facial and/or object recognition learning process may be capable of being carried out by the first user in response to the media object being created by the first user utilizing a camera (e.g. in response to an image and/or video being captured by the camera, etc.). In another embodiment, the facial and/or object recognition learning process may be capable of being carried out by the first user in response to compositing of one or more images. For example, in one embodiment, faces/users/objects may be associated during the compositing of the image before the image is created and/or saved. In this case, in one embodiment, the camera/processor may process raw frames of an image or video to identify faces and/or users and/or objects associated with those faces/objects prior to saving/creating the image. In other embodiments, the faces/users/objects may be associated in image pre-processing, and/or post-processing, etc.

In another embodiment, the media object may include an audio file. For example, in one embodiment, the audio file may include an audio recording associated with a captured image, or an audio-only recording. In one embodiment, the metadata may include a title, song name, or album title. In another embodiment, the metadata may include an artist name, a rating, a track number, a play time, a file size, and/or any other data associated with the audio file. In some embodiments, suggestions associated with the audio file may be made to determine the source and/or name associated with the audio file.

Further, in one embodiment, metadata may be shared directly between a first device of the first user and a second device of the second user. The device may include any type of device. In one embodiment, the device may include a mobile device. In various embodiments, the device may include a laptop computer, a tablet computer, a desktop computer, a mobile phone, a media player, a camera, a television, and/or various other devices. In one embodiment, the metadata may be shared between devices of the first user.

In another embodiment, the metadata may be shared between a first device of the first user and a second device of the second user via a service with at least one server. The service may include any type of service. For example, in various embodiments, the service may include a sharing service, a social network service, a photo service, and/or any other type of service. In another embodiment, the metadata may be shared between a first device of the first user and a second device of the second user via a service instance (e.g. a virtualized server instance, etc.).

Additionally, in one embodiment, the metadata (or a portion of the metadata) may be periodically communicated to the at least one server from the first device. Further, in one embodiment, the metadata may be periodically communicated from the at least one server to the second device. In another embodiment, the periodic communication may be dependent on location. For example, in one embodiment, if a user was in a known location (e.g. home, work, etc.), the communication may increase in frequency (e.g. due to WiFi coverage, etc.). In other embodiments, the amount of activity may control how often the periodic communication occurs. For example, in one embodiment, once a set number of metadata accumulates (e.g. a set data amount, etc.), then the metadata may be communicated from the at least one server to the first and/or second device.

The metadata and/or media object may be transferred and/or received utilizing any suitable technique. For example, in one embodiment, the metadata and/or media object may be transferred and/or received utilizing WiFi technology (e.g. via a router, WiFi Direct, etc.). In another embodiment, the metadata and/or media object may be transferred and/or received utilizing Bluetooth technology. In another embodiment, the metadata and/or media object may be transferred and/or received utilizing a near field communication technology. In another embodiment, the metadata and/or media object may be transferred and/or received over a cellular network. In another embodiment, the metadata may be transferred and/or received over the Internet. In another embodiment, the metadata may be communicated utilizing at least one of a push communication or a pull communication.

Still yet, in one embodiment, at least one person and/or object may be identified in the media object. Further, in one embodiment, it may be determined whether the identified at least one person and/or object is associated with the second user in accordance with at least one rule. In various embodiments, any number of rules may be associated with one or more users and/or between one or more users.

In some embodiments, the first and/or second user may each be associated with an individual (and/or two different individuals), an entity (and/or two different entities), a business (and/or two different businesses), a brand (and/or two different brands), and/or any other source.

In various embodiments, the rules may include any type of rules. In one embodiment, the rule may indicate that the at least one person is associated with the second user when the at least one person is the second user. In another embodiment, the rule may indicate that the at least one person is associated with the second user when the at least one person has a relationship with the second user. In another embodiment, the rule may indicate that the at least one person is associated with the second user when the at least one person has a relationship with a third user that has a relationship with the second user. Further, in one embodiment, the sharing of the metadata may be conditioned on the determination of whether the identified at least one person is associated with the second user in accordance with at least one rule.

In various embodiments, the metadata and/or the media object may be stored on a user device (e.g. a mobile device, etc.), a local server, a network server, a network cloud, a distributed system, and/or any other system. In one embodiment, the metadata may be stored with the media object. In this case, in one embodiment, the media may be shared with the metadata.

In another embodiment, an identifier may be stored with the media object for identifying the metadata. In various embodiments, the metadata identifier may be unique per media, per share, and/or per user group, etc. Additionally, in one embodiment, the metadata may be shared by sharing the identifier for identifying the metadata. In one embodiment, when requesting metadata, a device may request the metadata via an identifier associated with the metadata, and a service and/or user device may respond with the associated metadata.

In one embodiment, the metadata may be utilized in combination with additional metadata associated with the second user to create aggregate metadata. As an option, the aggregate metadata may be created utilizing a system associated with a service. As another option, the aggregate metadata may be created on a device associated with the first user and/or the second user. As yet another option, the aggregate metadata may be created on a device associated with a third user. In one embodiment, the aggregate metadata may be shared with users (e.g. with the first user, the second user, and/or a third user, etc.). In one embodiment, the metadata used to create the aggregated metadata may be stored utilizing multiple systems in different locations.

Further, in one embodiment, different metadata associated with different media objects of different users may be stored at the at least one server for processing. In this case, in one embodiment, the shared metadata may include processed metadata. Additionally, in one embodiment, the sharing may be conditioned on the processing. For example, in one embodiment, based on the processing result, it may be determined to share one or more media objects with one or more users. In one embodiment, the sharing may be conditioned on the processing and one or more rules. The processing may include any type of processing, such as a prioritization, a correlation, an assessment of the metadata, and/or any other type of processing.

As an option, users may be presented with the ability to specify settings associated with the sharing or metadata, portions of metadata, and/or media objects. In this case, the sharing between users may be conditioned upon the sharing settings associated with the users. For example, in one embodiment, it may be determined whether the first user permits the metadata to be shared. In this case, the sharing may be conditioned on the determination.

Once the metadata is shared, in one embodiment, the metadata may be utilized by the user with whom the metadata was shared. For example, once the metadata is shared with the second user, the second user may be allowed to utilize the metadata in connection with the media object. In various embodiments, the use may include storing the shared metadata, applying the shared metadata to one or more media objects, modifying the shared metadata, merging the shared metadata with other metadata, re-sharing the shared metadata, processing the shared metadata, and/or other uses of the shared metadata. In one embodiment, the second user may be allowed to utilize the metadata in connection with a different media object.

In one embodiment, metadata may include elements for facial and/or object recognition. In this manner, when metadata is shared from one device to a second device (including cloud based uploads), the ability for other devices to identify faces and/or objects increases as well.

Additionally, in one embodiment, at least one aspect of the metadata may be presented to the second user. In this case, in one embodiment, input in connection with the at least one aspect of the metadata may be capable of being received from the second user. As an option, utilization of the metadata may be conditioned on the input. In various embodiments, the input may include feedback, a rating, providing supplemental data, verifying data, correcting data, and/or providing various other types of input.

For example, in one embodiment, the second user may be allowed to input a rating in association with the metadata. In another embodiment, the second user may be allowed to utilize the metadata for filtering purposes. In another embodiment, the second user may utilize the metadata for further sharing purposes. Further, in one embodiment, the second user may use the metadata for recognition purposes (e.g. identify an object, identify a face, etc.). In another embodiment, at least a portion of the at least one input may be stored in association with the metadata.

Further, in one embodiment, a query may be received from the second user, and a response including a plurality of the media objects may be sent based on the query. In various embodiments, the query may identify at least one of a location, a time, and/or a person's name or alias for use in association with facial recognition. In another embodiment, a query may be received from the second user, and a response including particular metadata may be sent based on the query.

In another embodiment, a query may be received from a user, and a response including a plurality of suggestions for may be sent based on the query. In this manner, media objects are not sent back to the user, but only suggestions (e.g. face, name, etc.) based on the query.

Still yet, in one embodiment, the metadata may be shared with a group of users. In one embodiment, the group of users may include an ad-hoc group. Additionally, in one embodiment, the group of users may be formed based on at least one of a time, a location, or a facial recognition. In another embodiment, the group of users may be formed based on a set of recognitions. For example, in one embodiment, the group may be formed based on identifying faces of a first person, a second person, and a third person.

Further still, in one embodiment, the group of users may be formed based on at least one of a password, an invitation pass (e.g. Apple Passbook card, etc.), a permission file (e.g. PKI file, etc.), or one or more sensors (e.g. detection of two or more devices located nearby, etc.).

In another embodiment, members of the group may be capable of being restricted. For example, in various embodiments, members of the group may be restricted from modifying metadata (or portions thereof), adding metadata, viewing metadata (or portions thereof), viewing media objects (or certain media objects), and/or may be restricted in a variety of other ways.

In one embodiment, potential new members of the group may be capable of being identified based on the metadata or a lack thereof. For example, in one embodiment, a person in an image may be identified by the metadata and may further be identified as a potential new member of the group. Moreover, in one embodiment, users of the group may create, edit, and/or add to the metadata and share the edited metadata with the other users in the group. In this way, work performed by one user of the group may reduce the work needed to be performed by another user in the group. For example, in one embodiment, a total workload in connection with creating the metadata may be reduced by sharing results of an individual workload of the first user and the second user Furthermore, in one embodiment, the metadata may be utilized to advertise to a user or the group of users. For example, in one embodiment, the metadata may be used to determine targeted advertisements to display and/or present to a user or group of users (e.g. on mobile devices associated with the users, etc.).

More illustrative information will now be set forth regarding various optional architectures and features with which the foregoing techniques discussed in the context of any of the present or previous figure(s) may or may not be implemented, per the desires of the user. For instance, various optional examples and/or options associated with the identifying of metadata of operation 302, the sharing of metadata of operation 304, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 5:
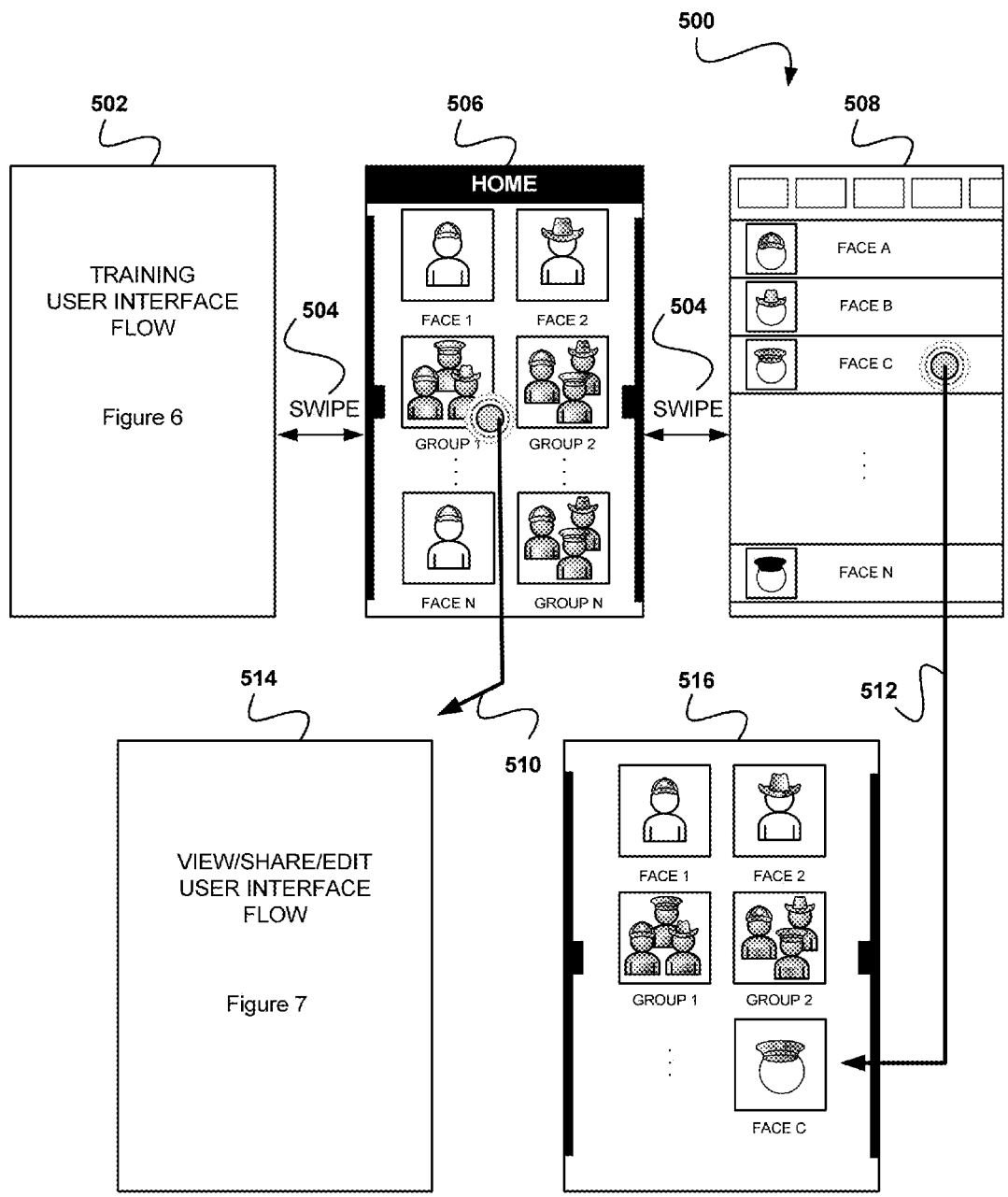
FIG. 5 shows an exemplary system flow for providing suggestions based on object recognition, in accordance with another embodiment.

FIG. 5 shows an exemplary system flow 500 for providing suggestions based on object recognition, in accordance with another embodiment. As an option, the system flow 500 may be implemented in the context of the architecture and environment of the previous figures and/or any subsequent figures. Of course, however, the system flow 500 may be carried out in any desired environment.

As shown, a variety of interfaces are shown including a home interface 506 from which a training user interface 502 (FIGS. 6A and 6B), a suggestions user interface 508, and a view/share/edit user interface 514 (FIG. 7) are accessible.

Figure 6A:
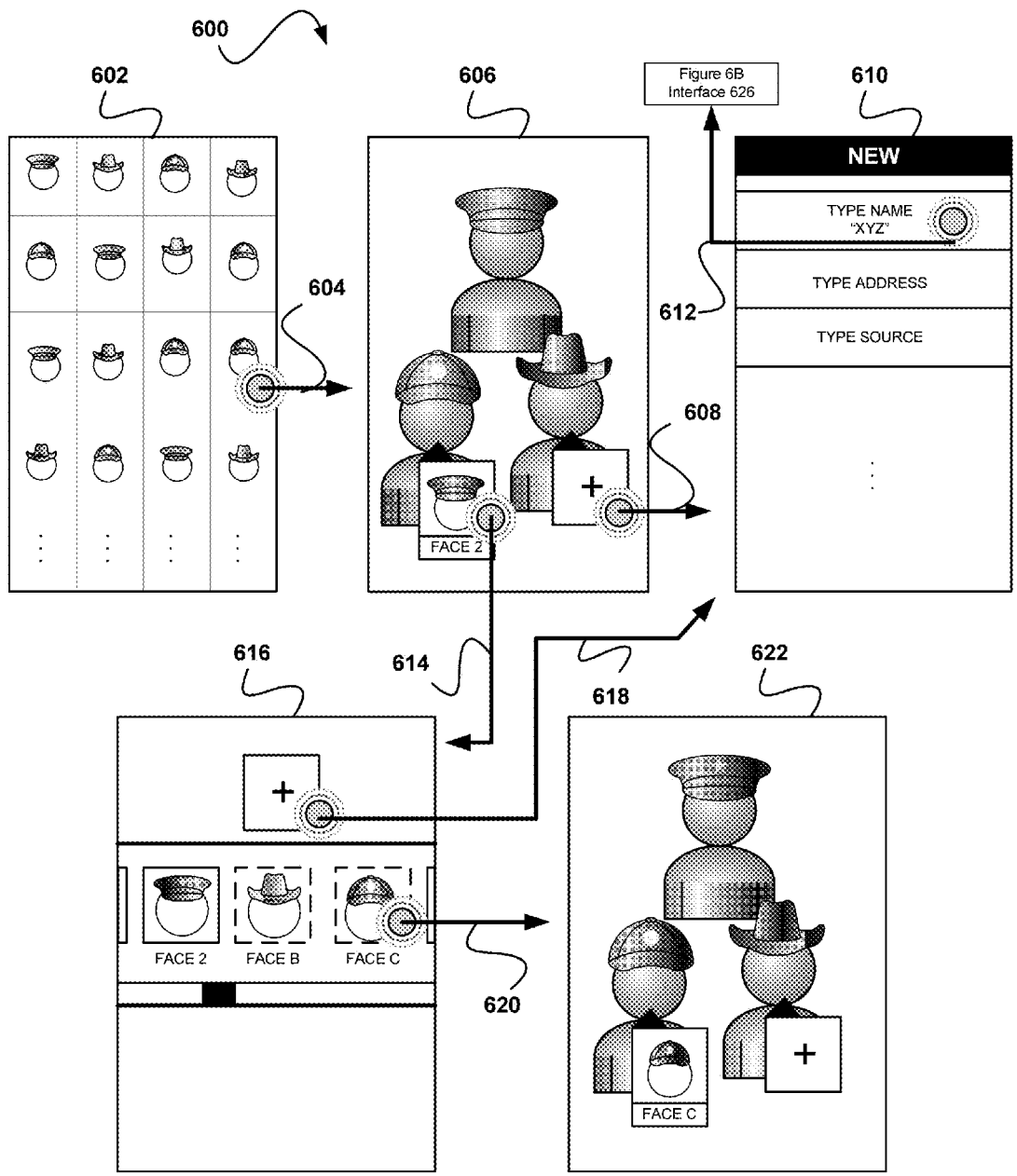
FIG. 6A shows an exemplary system flow for training a system, in accordance with another embodiment.
Figure 6B:
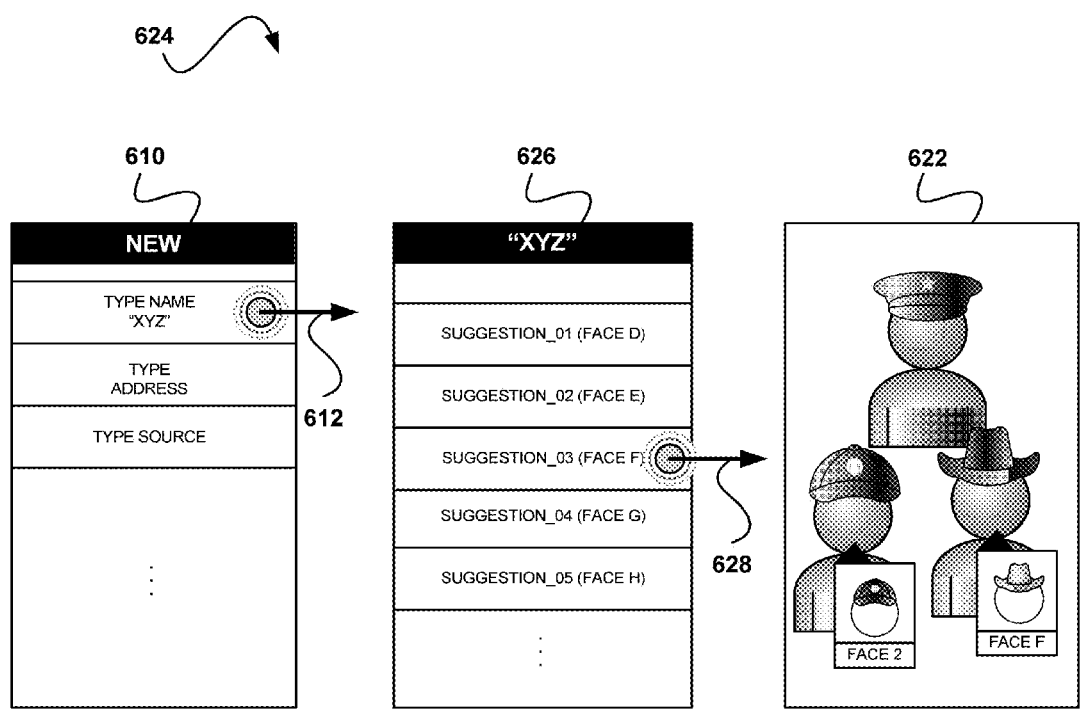
FIG. 6B shows an exemplary system flow for training a system, in accordance with another embodiment.

The training user interface 502 corresponds with a training user interface flow, as found in FIGS. 6A and 6B. The training user interface 502 is accessible from the home interface 506 by swiping 504. Conversely, swiping 504 from the training user interface 502 causes the home interface 506 to be displayed. Similarly, the suggestions user interface 508 is accessible from the home interface 506 by swiping 504. Conversely, swiping 504 from the suggestions user interface 508 causes the home interface 506 to be displayed.

In various embodiments, the home interface may include a collection of photos. Of course, in other embodiments, the home interface may be organized based on photos, faces, groups, and/or any other collection of images. In one embodiment, the displayed images may be organized and rearranged as desired by the user, including dragging and dropping one or more faces/groups onto another face and/or group. In this manner, groups may be created, populated, and/or edited in some manner. Additionally, in one embodiment, even after a face has been dropped and added to a group (or to another face to create a group), the face can, in like manner, be dragged out of the group to be a singular face (as it originally was), or can be dragged into a separate group (or to another face to create another group).

Home interface may include one or more indications to indicate additional screens associated with the home interface. For example, as shown, the right and left sides of the home interface may include a vertical bar to indicate that an additional screen exists on the right and on the left. In another embodiments, a number may be displayed above the vertical bar (on both or either side) to indicate the number of other screens which may be displayed by swiping to the left and/or the right. Of course, in another embodiment, functionality associated with swiping may cause other the current home screen to display additional icons, faces, groups, and/or images (as opposed to displaying additional screens, etc.). Additionally, in other embodiments, any indicia may be displayed to indicate further screens which may be associated with the home interface.

In another embodiment, the one or more indications may function similar to a deck of cards held in a hand. The front card may be viewed in the center in its entirety, but the immediate cards to the right/left side may be viewed just in part (e.g. a small fraction of the card, etc.) sufficient that the user can see what is there. Of course, in another embodiment, the device may use sensors (e.g. gyroscopes, accelerometers, etc.) to determine the motion associated with the device and take one or more actions in response. For example, shifting the device to the left may cause the card on the left to be displayed in part, whereas shifting the device to the right may cause the card on the left to minimized to the side (with only the indication bar present), and shifting the device to the right may cause the card on the right to be displayed in part. Of course, in other embodiment, motion and inputs may be used in any manner to alter how objects and screens are viewed and manipulated.

In one embodiment, grouping faces may occur automatically. For example, a mobile device may have contact information, including one or more relationships between the user and/or contacts. In other embodiments, a cloud-based system may have information indicating one or more relationships between the user and/or contacts. Based off of such information, the mobile device may automatically group faces together (e.g. group together immediate faces of family members, group together faces of work contacts, etc.).

In one embodiment, grouping and/or rearranging the faces may allow the user to apply filters to the one or more faces and/or groups. For example, filters may include ability to restrict faces/images/groups/objects displayed, including restricting by location, name, date, device type, client type (e.g. show only work clients, etc.), degree of relationship (e.g. show only contacts of first degree relationship, etc.), and/or any other filter which may be used to restrict the faces/images/groups/objects displayed.

In one embodiment, faces and/or objects displayed on the home user interface may include media objects stored locally (e.g. on the device, etc.), stored externally (e.g. cloud based, etc.), and/or locally cached (e.g. temporarily, etc.) but otherwise stored permanently externally (e.g. cloud based, etc.). In one embodiment, the user may select a default view (e.g. local media objects, web media objects, etc.). associated with the home user interface. Further, in another embodiment, the user may select between media objects for which the user has performed some training, and/or other media objects trained by a particular individual (e.g. a trusted friend, etc.).

In another embodiment, the training user interface 502 may be used to train the system on facial and/or object recognition. As an example, a user may swipe from the home user interface to train the system on an unidentified face. The user may go through the steps necessary to associate a name and/or contact with the face. Of course, such a system could also apply to object recognition. Once the user has finished associating the name and/or contact with the face, the system may save the correlation. Henceforth, if the system comes across the face in other photos, the training may enable the system to recognize and identify the face consistent with the correlation. In one embodiment, such correlation resulting from training the system may belong and stay with the user's device. In other embodiments, however, such training and correlation may be shared with other individuals, such that other individuals can now benefit from the training already completed by the user. In this manner, other individuals will not necessarily need to train their system (or at least to the same extent) to recognize the face already identified by the user. In one embodiment, the correlation and training may be saved as metadata, and the sharing may involve transferring metadata from one device to a second device.

In one embodiment, if a first user shares metadata relating to correlations and/or training to a second user, the second user may receive the benefit of the prior training. However, sharing can also be between the second user and the first user. For example, first user shares 10 photos with second user, the first user already identifying an individual in the photo as "Bob." Once such photos are shared with the second user, the device associated with the second user may display the prompt "User 1 sent you 10 new photos of Bob. We found 5 additional photos of Bob already stored on your phone. Would you like to share them with User 1?" In this manner, leveraging the training by User 1 may allow the device of User 2 to identify other potentially relevant photos to share back with User 1. Of course, in another embodiment, any training by User 2 (or any other user) may be leveraged to identify potentially relevant media objects.

In another embodiment, correlations and metadata may be saved to a cloud-based service (e.g. online database, etc.). In some instances, syncing between a local device and a cloud-based service may include comparing metadata and/or other information associated with a face/object. In one embodiment, an online service may be used to verify inputted information on a local device. In another embodiment, if there is a difference between the data on the local device and data on the cloud-based service, the user may decide which data should be saved (i.e. user may choose to override cloud settings, etc.). In one embodiment, the user may have permission (e.g. elevated permission, administrator, etc.) to cause a metadata from a local device to override metadata on a cloud-based service.

In another embodiment, the home user interface 506 may include images (e.g. faces, groups, full images, etc.) stored on the user's device, from a cloud system, images which have correlations already done (e.g. either by training or through receiving correlations/training from other users and/or devices, etc.), as well as images for which correlations have not been made (in the form of suggestions, etc.).

As set forth earlier, swiping 504 to the right of the home user interface 506 may cause the training user interface 502 to be displayed. Of course, in other embodiments, the training user interface may be displayed in response to other actions (e.g. long press on face/group/image and select option to train, etc.). Additionally, in one embodiment, the user may select multiple faces and/or groups (e.g. in batch mode, etc.) and then either select a dropdown option to train, or swipe to the right to train based on all of the images selected.

Additionally, as set forth above, swiping 504 to the left of the home user interface 506 may cause the suggestions user interface 508 to be displayed. In one embodiment, the top of the suggestions user interface 508 may include quick sort buttons and/or tabs which may be used to filter the suggestions in some manner. For example, in one embodiment, the user may start to type in a name (e.g. in a quick sort text field, etc.), which may immediately cause the suggestion(s) to only be displayed if it conforms to the typed text.

In other embodiments, quick sort buttons and/or tabs may include preconfigured settings. For example, in one embodiment, a user may have previously filtered the suggestions down to immediate family contacts, and a date restriction of between 1980 and 1990. Such information could be saved as a preconfigured shortcut. Of course, in other embodiments, quick sort buttons and/or tabs may include any preconfigured setting, and/or a list of default quick sort buttons and/or tabs including listing suggestions based on relevancy, date, age, name, location, previously removed (e.g. may have a lower priority sort order, etc.), etc.

In one embodiment, the suggestion user interface 508 may be used for any new face to be shown on the home user interface 506. For example, if out of 6 new photos, 4 include new 3 new faces, then the suggestion screen may include such 3 faces as suggestions to add to the home user interface 506. In some instances, such new faces may be suggested without any correlation to a known name (e.g. new face without the benefit of any training, etc.). In other instances, a correlation may be established based on prior training, and therefore the suggested new face may be presented in connection with a known correlated name. In this manner, the home user interface may be updated with new faces, groups, etc.

In one embodiment, if no face exists on home user interface 506, the user may swipe to the right to the training user interface 502 to select such an unknown face and correlate the same with a name. In another embodiment, the user may swipe to the left to suggestion user interface 508 to include a face that is already correlated with a known name. Thus, in one embodiment, using the suggestion user interface 508 may assume that some training has already occurred such that a suggestion can even be made. If training has not occurred (e.g. or a confidence level of suggestions is below a set threshold of confidence, etc.), then a suggestion may not appear, and the training user interface 502 (or receipt of training information from other devices) may be required. In another embodiment, if a suggestion is selected 512, then the screen goes back to updated home user interface 516, but now the suggested face is shown.

As shown, if a user selects an item 510 from the home screen (e.g. an image, a group, an object, a face, etc.), the view/share/edit user interface 514 (FIG. 7) is displayed.

In other embodiments, gestures may be used in conjunction with the home user interface 506 to enable greater functionality. For example, swiping top to bottom may allow a user to scroll through the displayed photos; swiping bottom to top may bring up options associated with the home screen (e.g. batch modifications, enable training, share, edit past training, etc.); two-finger magnification may increase and/or decrease the size of the displayed photos, whereby as the image size increases, functionality associated with the image increases as well (i.e. as the image size grows, a name may be listed directly under the face, etc.); a two-finger swipe (in any direction) may cause a separate interface to be displayed (e.g. one-finger swipe may be used to navigate among the photos whereas a two-finger swipe may be used to navigate among the user interfaces, etc.).

In one embodiment, the images displayed on the home user interface 506 may additionally display indicators associated with one or more of the photos. For example, in one embodiment, for faces where one or more new or old photos have been the subject of a new identification of a known face therein, a red numbered circle (or some indication) may be shown next to the photo (where the number indicates the number of photos). Of course, other indications (e.g. colored border, dot thereunder, notifications, password screen indicators, etc.) may be utilized to communicate the same.

In another embodiment, having one or more faces in a group may or may not eliminate the possibility of having such faces in other groups as well. For example, in one embodiment, a user's brother may be found in both a "family" group as well as a "work" group. As such, a face may be organized as desired by the user, including putting the face in more than one location (e.g. in one or more groups, in no groups, etc.) on the home user interface.

In another embodiment, icons on the home user interface may be associated with preconfigured actions. For example, with an icon for "sharing", a user may drag and drop one or more users and/or groups into the icon, and after completing the dragging and dropping, the user may select share to empty the contents of the icon and send it via email to a number of intended recipients. Of course, in another embodiment, the contents of an icon (e.g. those items which were dragged and dropped into it, etc.) may be emptied as desired by the user (e.g. user can go back after the action is complete to delete the contents, contents may be automatically deleted after a set time period, etc.). In other embodiments, icons may include functionality such as share, print, post (e.g. a blog, etc.), upload (e.g. to cloud storage, to social network system, etc.), and/or any other action. In one embodiment, applying an action associated with an icon may include sending the faces and/or images associated with the face and/or the metadata associated with the faces/groups/images.

FIG. 6A shows an exemplary system flow 600 for training a system, in accordance with another embodiment. As an option, the system flow 600 may be implemented in the context of the architecture and environment of the previous figures and/or any subsequent figures. Of course, however, the system flow 600 may be carried out in any desired environment.

As shown, photo user interface 602 includes a representation of photos (e.g. in a camera roll). In one embodiment, such photos may be all-inclusive (i.e. all photos in a camera roll, etc.). In another embodiment, such photos may be filtered (or filterable) based on date, time, sharing/shared status, content, etc. In terms of content, the photos may be filtered based on, for example, whether there is at least one unknown face therein (based on previous correlations/training data). In other embodiments, photos with a higher number of unknown faces may be ordered higher. Still yet, the photos presented for training may be selected such that the first set of photos displayed (without scrolling) have at least one unique unknown face therein (with respect to the other photos in the first set of photos). While this may require processing of photos to distinguish between unknown faces, it would have the optional benefit of allowing the user to more quickly (i.e. with less scrolling, searching, etc.) identify a face to be subject of training. To this end, potential training subjects to be used in training can be made more readily available to the user (i.e. only photos including faces that need training or have a higher likelihood to require training are displayed or prioritized, etc.).

In one embodiment, selecting a face 604 may cause a full image interface 606 to be displayed. The full image interface includes a first representation image with at least one face. The first representative image may display a graphical and/or textual indication associated with each of the faces. For example, in one embodiment, a first face may be known and thus include a name therefor and possibly a default picture thereof, while a second face may be unknown and therefore be a candidate for training. Of course, in other embodiments, the arrangement of the graphical and/or textual indications may occur in any manner.

In some embodiments, the default face may be incorrectly associated with the first detected face. In such an embodiment, the user may select the face 614, select the correct face 620 on the modify correlation user interface 616, and an updated full image interface 622 may then be displayed. In one embodiment, the user may scroll through possible faces on the modify correlation user interface 616, filter faces (e.g. based on restrictions, etc.), add in a new face correlation, and/or modify any existing correlation.

In one embodiment, indications may be associated with scrolling through possible faces. For example, a solid border may indicate the currently selected face associated with the individual, a dashed line border may indicate possible alternative or best alternative suggestions, a no-line border may indicate other contacts without any preference given.

In another embodiment, swiping the scroll function right or left may change the individual displayed (e.g. a representative photo for each individual, etc.), whereas swiping the photo up or down may change the photo for the individual. For example, in on embodiment, if the default face on the full image interface 622 is incorrect, the user may scroll through the modify correlation user interface 616 by swiping left or right until the correct individual is found. Next, the user may swipe up or down (up to go up in age, down to go down in age, etc.) until the appropriate age of face associated with the individual is shown, as is found in the representative photo.

In another embodiment, the faces displayed on the scrolling pane may be included based on a relevancy score (e.g. high score indicates higher relevancy, etc.). For example, in one embodiment, the default face displayed in the full image interface 622 may in fact be correct, but the default face may be a decade older than the face associated with the photo. As such, selecting the default face may display many other faces associated with the individual over the past 20 years, and the user may select the best default face for that time period in the individual's life. Of course, in another embodiment, the correlation may simply be incorrect, in which case, the user may be allowed to correct the incorrect correlation via the modify correlation user interface 616.

As shown, a new identifier may be added 618, resulting in a new identifier interface 610. The new identifier interface 610 may allow the user to input information associated with a previously uncorrelated face, including inserting a name, address, source (e.g. Facebook, Twitter, Flicker, LinkedIn, MySpace, etc.), and/or any other information which may be associated with the user. In one embodiment, the new identifier interface 610 may be invoked if the suggested faces/identifiers do not include the correct face/identifier.

In one embodiment, after inputting information (e.g. at a minimum, a name, etc.), a user may select the name of the individual to correlate with the face. As an option, inputting the aforementioned information may also allow the user to see if training has occurred previously for various individual. If training has occurred, the user may wish to correlate new face with an identifier associated with previously established training, etc., so as to avoid having two different training data sets associated with the same person. As shown, the user may select the inserted name 612, and be directed to suggestions interface 626 in FIG. 6B.

In one embodiment, the full image user interface 606 may also receive gesture input. For example, in one embodiment, after selecting a face on photo user interface 602, the first representative image with the selected face may be displayed. The user may swipe the user interface right or left to display other images associated with the selected face. In one embodiment, this may be accomplished whether the face has been already correlated with an identifier or not (assuming that the system has processed the photos to identify similar faces regardless of being correlated with an identifier). Additionally, the user may adjust the magnification of the image so that more than one image may be shown simultaneously. Of course, however, as the number of images increase on the screen, the amount of information (e.g. graphical and textual information, etc.) displayed may decrease.

FIG. 6B shows an exemplary system flow 624 for training a system, in accordance with another embodiment. As an option, the system flow 624 may be implemented in the context of the architecture and environment of the previous figures and/or any subsequent figures. Of course, however, the system flow 624 may be carried out in any desired environment.

In one embodiment, the suggestions interface 626 includes one or more suggestions associated with the inputted name. In another embodiment, each suggestion may include a graphical default face associated with the name. In various embodiments, the suggestions displayed may be based on relevancy factors (e.g. confidence level, etc.) and/or any other filter. In one embodiment, if none of the suggestions apply to the inputted text (i.e. they are all incorrect, etc.), the user may select to create a new correlation. In this manner, information inputted into the new identifier interface 610 may be used to create a new correlation with the name. In such an embodiment, the user may also select a default face to be associated with the correlation (not shown in the figure).

Once a suggestion is selected (or a new correlation is confirmed), the updated full image user interface may display the updated information, including a default face below the detected face, as well as a name associated with the default face. Additionally, in other embodiments, if any of the information on the updated full image user interface needs to be updated, the user may repeat the steps hitherto described.

In one embodiment, new identifier interface 610 may include the option to include multiple pictures of the individual. For example, in one embodiment, many pictures of the individual, including multiple age groupings associated with the individual, etc. may be shown.

In another embodiment, a preference on the new identifier interface 610 may be to select a suggestion as found on suggestion user interface 626. In one embodiment, a suggestion may not be retrieved if the inputted name is not found on any of the accessed databases. In some embodiments, close matches associated with the inputted name may also result (i.e. to correct potential misspellings, etc.).

In one embodiment, completing a profile for an individual may include a unique identifier for the person. In some embodiments, the unique identifier may come from an online source (e.g. Facebook id, LinkedIn id, etc.). Additionally, in another embodiment, more than one unique identifiers may exist and be linked to the user profile.

In another embodiment, a profile of the user may be completed, as desired. For example, such profile completion may include pulling other information from an online account. For example, in one embodiment, a photo sharing site may have many images where one or more users have already been tagged in some manner. The profile may pull such information and use it to improve the facial recognition capabilities of the system. In one embodiment, the user may be presented with a request (a permission) to share such content with other third parties (e.g. the facial recognition software system). For example, when accessing an online photo sharing site, the user may be presented with a prompt, "Photos associated with USERX are detected. Would you like to share such photos with SYSTEMX to improve facial recognition?" Of course, any prompt may be provided whereby the user may choose to give some permission to access and retrieve the data.

Of course, in other embodiments, a similar process may occur to improve object recognition capabilities as well. For example, in one embodiment, a user may take a picture of bottle of ketchup which was not previously found with a correlation. Upon creating the profile, it was found that another user on a social media site had tagged and identified the ketchup. Based on such information (and assuming permission was granted), the profile may be updated to include any relevant photos and/or previously configured associated metadata (e.g. the tags, etc.).

In one embodiment, the new identifier interface 610 and the suggestion user interface 626 (and any of the other user interfaces associated with the system) may use a first and/or secondary database for assisting in creating a profile and/or in conducting the facial recognition. For example, in one embodiment, when creating a new profile for a user, a local database may be searched to determine if any contacts can be used as suggestions. If no contacts are found, then the search may extend to a secondary database, such as on a second device, in the cloud, or with a database system associated with another user. Of course, in other embodiments, a first database system and a second database system may be distinguished as necessary based off of response times (e.g. local cache may be faster than external separate storage system, etc.), storage amount (e.g. first database may have reduced sized images for quicker searching, etc.), permissions (e.g. associated with a user and/or a group, etc.), and/or any other characterization which may influence whether a first and/or a second database system is used to retrieve potential suggestions. In a further embodiment, when a suggestion is presented, the source database may be indicated (e.g. local cache, cloud-based server database, database associated with USER Y, etc.).

In one embodiment, selecting a suggestion may cause a correlation to form between the selected face and the suggested profile information. After creating the correlation, the user may further refine the profile by adding in additional images (e.g. relating to the face, etc.), as well additional textual information (e.g. identifications, online systems, etc.).

In other embodiments, any user interface that displays a face, a group, and/or an image, additional functionality may exist. For example, in one embodiment, tapping a face may cause a secondary graphical user interface to display (e.g. hovering over the current user interface, etc.). Such a secondary graphical user interface may include the details of the profile of the individual associated with the face. Additionally, the secondary graphical user interface may display, in response to touching any part of the image which does not include a face, an options interface. Such an options interface may include the ability to share the photo, a designation of the permissions setting for the photo (e.g. private, private but shared, public, etc.), and/or any other option which may relate to the image. Of course, in other embodiments, such options may relate additional to the specific faces recognized in the image.

In another embodiment, tap zones associated with the photo may trigger separate actions. For example, as just described, tapping the face may cause one action (e.g. profile to be displayed), tapping a non-face area may cause a second action (e.g. options to be displayed), etc. Additionally, specific zones in the image may be established and associated with a specific action.

Figure 7:
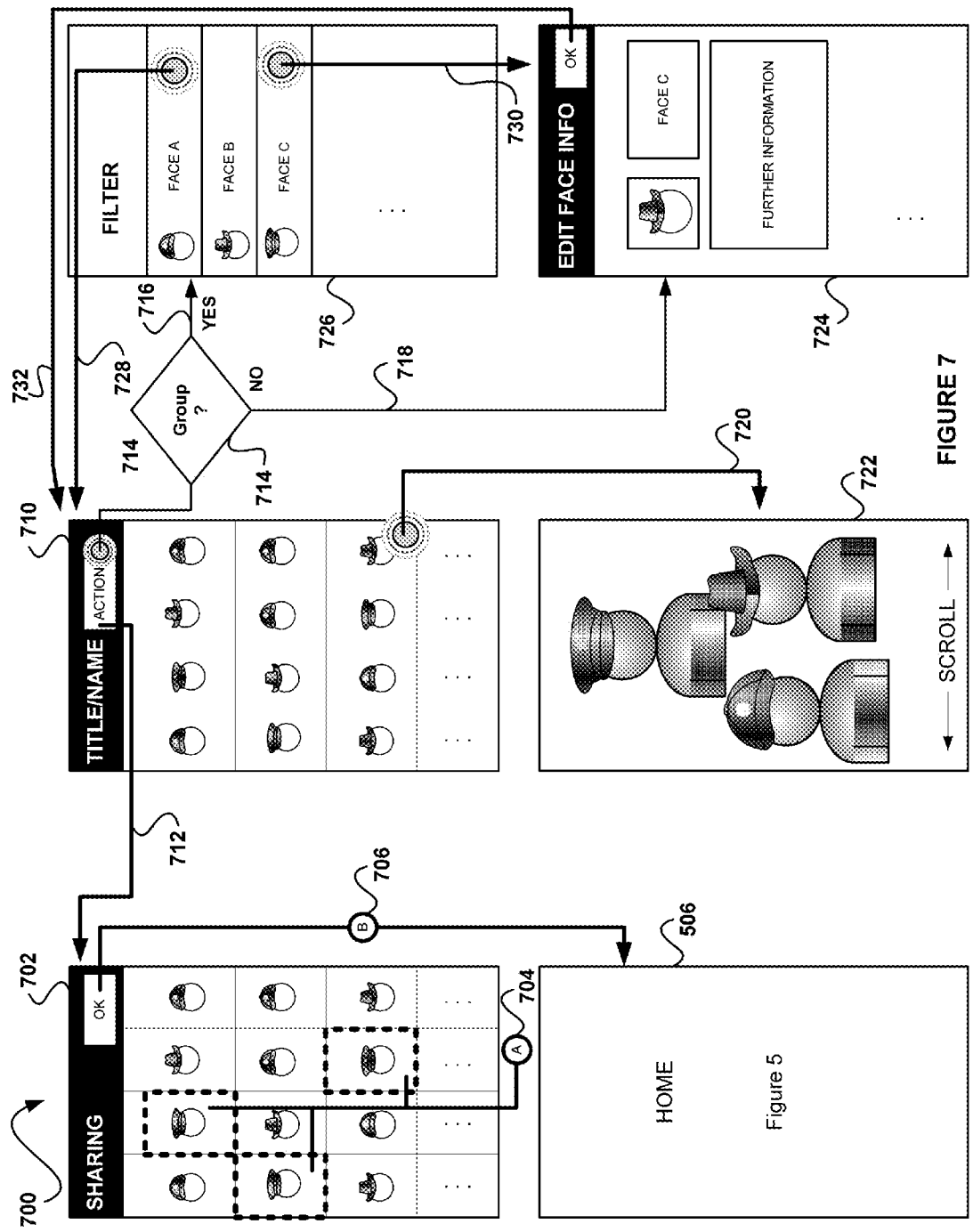
FIG. 7 shows an exemplary system flow for sharing based on object recognition, in accordance with another embodiment.

FIG. 7 shows an exemplary system flow 700 for sharing based on object recognition, in accordance with another embodiment. As an option, the system flow 700 may be implemented in the context of the architecture and environment of the previous figures and/or any subsequent figures. Of course, however, the system flow 700 may be carried out in any desired environment.

As shown, a title/name user interface 710 is included that is displayed, for example, in response to a selection of one of the faces displayed in the home user interface 506 of FIG. 5. From the title/name user interface 710, a sharing user interface 702 may be displayed in response to a user input, in the manner shown.

As shown, sharing user interface 702 includes faces and images. In one embodiment, the faces and images displayed in the sharing user interface 702 are set to a default setting of being shared (e.g. with friends, cloud based systems, etc.). In such an embodiment, sharing user interface 702 may be used to deselect photos in some manner (e.g. touch photos which should not be shared, etc.) such that the home user interface 506 displays those images which have been allowed to be shared.

The aforementioned sharing may be carried out utilizing any of the techniques disclosed explicitly (or by incorporations by reference) in U.S. patent application Ser. No. 14/085, 832, filed Nov. 21, 2013, and entitled "SYSTEM, METHOD, AND COMPUTER PROGRAM PRODUCT FOR SHARING METADATA ASSOCIATED WITH A MEDIA OBJECT," which is incorporated herein by reference its entirety. To this end, in the current embodiment, a user may remove photos from an all-inclusive set that would otherwise be shared in according with sharing rules in place, whereby any photos (not de-selected) are shared with other devices of a third parties with whom the user has formed a sharing relationship.

Of course, in other embodiments, the user may select the default setting to not share images.

As an example, sharing user interface 702 may be displayed with a default setting of sharing items. Item A 704 indicates those images which have been selected, and which indicate that such images should not be shared. When the button "OK" is selected, item B 706, the home user interface 506 is displayed in response.

As shown, title/name user interface 710 may include any photo and/or image associated with the user and/or the device correlated with the at least one face selected in the home user interface 506 of FIG. 5. In some embodiments, the title/name user interface may include a photo gallery of items stored on the local device, as well as of items stored on a cloud or external based system.

In one embodiment, the title/name user interface 710 may include the ability to scroll up and down through images. Additionally, in one embodiment, swiping left and/or right may display other options and/or photo collections. For example, in one embodiment, swiping to the side (e.g. either left or right, etc.) may cause the display of any other interface which may be associated with the photo collection and/or the face of interest in some manner.

As mentioned earlier, the title/name user interface may include the ability to take an action, the action including the ability to group, share, send, edit, delete, and/or take any other action. In one embodiment, a user may select a number of images and/or photos. The user may select the action "share" 712 which may cause sharing user interface 702 to be displayed. In another embodiment, the user may select the action "edit" and then a determination may occur to determine if the images are associated with a group. See decision 714. If it is determined that the items are associated with a group, filter user interface 726 is displayed. See operation 716. If it is determined that the items are not associated with a group (e.g. the items are associated with a single face), then edit face info user interface 724 is displayed.

In one embodiment, a group may consist of two or more media objects, including two or more images, groups, audio files, and/or any two other media objects.

In another embodiment, the filter user interface 726 may include faces of individuals included in the group. In one embodiment, the individuals included in the group may be filtered based on user input, including applying edits (e.g. selecting one or more faces to remove from the group, etc.), date restrictions, and/or any other filter to modify the group in some manner.

In one embodiment, the edit face info user interface 724 may include displaying the default face, as well as other graphical and/or textual information associated with the face. In one embodiment, the edit face user interface 724 may function substantially similar to new identifier interface 610 previously described, wherein a profile may be created and/or edited for an individual whereby correlations may be made. As shown, after finishing any edits associated with a face, the button "OK" may be selected 732, and the title/name user interface 710 may be displayed in response.

In another embodiment, selecting a photo on title/name user interface 710 may allow one to browse all photos associated with the face of interest. For example, in one embodiment, selecting a photo 720 in title/name user interface 710 may cause photo interface 722 to be displayed. In various embodiments, the user may scroll (e.g. swipe right to left, etc.) to view other photos associated with the selected face. In other embodiments, the user may tap a face to view additional profile information, long tap a face to bring up options for the face, tap the image (i.e. non-face portion, etc.) to view additional image information, long tap an image (i.e. non-face portion, etc.) to view options for the image, etc.

In one embodiment, it may be detected whether a photo has a shared setting associated with it. For example, in one embodiment, 15 photos may not have any shared setting associated with them, and the system may indicate "You have selected 15 photos which include identified faces but for which no shared setting exists. Would you like to setup shared settings now?" The user may proceed with creating shared settings for any or all of the 15 photos. In another embodiment, the title/name user interface may indicate the number of photos (e.g. via a number at the top of the user interface, etc.) for which shared settings have not been set. In one embodiment, the user may select the displayed number to restrict the photos only to those for which shared settings have not been set. Of course, such indications (or any others disclosed herein, for that matter) may be presented in the context of any of the interfaces disclosed herein (e.g. home interface, etc.), and/or any other interface.

In another embodiment, choosing to share one or more media objects may relate to current media objects and potentially to future media objects as well. For example, in one embodiment, a first user may share pictures of USERX with a second user. The second user may view such pictures of USERX on the second user's device. Additionally, if the second user were to select USERX's face at some point in the future, the pictures associated with USERX may be updated based on any additional photos taken by the first user. In like manner, any photos taken of USERX by the second user may be sent back to the first user such that if the first user select's USERX's face, the first user will also see an updated collection of photos, as updated by the second user.

Of course, in one embodiment, the sharing of media objects (e.g. photos, etc.) to and from two or more users is based on shared settings associated with a media object (e.g. images, photos, etc.), with an individual (e.g. share all images associated with USERX, etc.) and/or with the user (e.g. do not share any photos taken by me, etc.). Of course, in one embodiment, sharing user interface 702 may be used by the user to select which photos should not be shared (or shared, depending on how the user has configured the settings).

In one embodiment, if a user is invited to view photos with metadata (for which training has already occurred), then the device associated with the user may immediately leverage the previously completed training in installing the software system for use by the user (to view/organize/edit the photos, etc.). In this manner, images and metadata may be sent to the user and utilized by the user's system in providing facial recognition for received photos, as well as photos already stored on the user's device (which relate to the completed training, etc.).

In another embodiment, if a user installs the software system without any invites, then the user may need to spend additional time inputting training material into the system so that facial and/or object recognition can occur. Additionally, if the software system is installed from scratch, the user may still leverage any information available through online sources (e.g. social networking, public resources, etc.) to more easily and fully establish profiles for individuals associated with the user. In this manner, metadata associated with the images may be created by the user and aid in facial/object recognition. Of course, in one embodiment, such metadata may be shared in like manner with other users to aid in facial/object recognition.

In one embodiment, establishing connections with other individuals may aid in creating a more comprehensive facial/object recognition system. For example, if the user connects to 100 other users, and each of those users train their system on one additional individual, each of the 101 user systems may benefit from each of the training performed by each of the users (assuming each user shares the training metadata information).

In another embodiment, media objects may be shared with restrictions. For example, in one embodiment, a user may select to share photos only to those with a first degree connection (e.g. those individuals who are directly associated and/or connected to the user in some manner, etc.). In such an embodiment, however, the user may select to share metadata to individuals up to a fourth degree connection (or any degree as selected by the user, etc.). In such a manner, therefore, the user may control how images and/or metadata is shared and/or distributed with other individuals.

In one embodiment, metadata may include a bucket designation. For example, in one embodiment, a bucket may be an age range associated with the individual, including ages 0-1, 2-3, 4-5, 6-7, 8-10, 11-13, 14-16, 17-19, 20-25, 26-30, 31-40, 41-50, 51-60, 61-70, 71-80, and/or 81-90. Of course, in other embodiments, the bucket age groups may be modified and/or set as desired by the user and/or the system. In one embodiment, each media object may be associated with a bucket associated with the individual. In this manner, facial detection may take into account the age of the individual into determining the correlation. Additionally, given the fact that child's appearance changes more rapidly than an adult's appearance, it may make sense to restrict/narrow the age range for buckets for lower ages.

Additionally, in one embodiment, metadata may be grouped based on time. For example, in one embodiment, a user may tag a new face, and the system may request the approximate age of the individual associated with the face. The user may input the approximate year the individual was born. Using such information, the system may use the age information to determine a bucket (i.e. a rough estimate, etc.) in which to classify the face. In one embodiment, the time of the picture may also be taken into consideration in determining the bucket in which the face should be put.

In another embodiment, metadata may be grouped using a variety of factors, including but not limited to, age (using the bucket system just described, etc.), time of day, distance from a set location, when the photo was taken, etc. In this manner, metadata may be fetched and applied in a more effective and efficient manner for facial recognition. For example, rather than searching through all photos in existence to determine the name of the individual in a photo, the user may indicate the date the photo was taken (or it may be automatically determined via information imprinted on the photo, etc.), and the location may be more readily recognized. Using both factors (e.g. location and date of photo, etc.), such information may be used to restrict which metadata should be searched to determine with facial features can be recognized.

In one embodiment, metadata may be updated and/or improved through collaborative effort. For example, in one embodiment, a user may create a first profile including metadata associated with a first individual. However, the user may recognize that metadata inputted for the first individual is weak (e.g. default photo is not clear, no information on the individual is known besides his name, etc.). As such, in one embodiment, the user may request further information from other connections, and send a request out to other connections indicating "I have identified USERX in the following photo. Can you please help me fill in additional information about USERX?" In this manner, metadata may be improved through collaborative effort. In one embodiment, soliciting information from connections may be restricted to a set number of nodes and/or degrees of connections (e.g. request information only from a first or second degrees of connections, etc.).

In one embodiment, a lightweight version of the metadata may exist. For example, in one embodiment, metadata may include all data that is needed in order to independently recognize the face/object associated with the metadata. In one embodiment, a lightweight version of the metadata may exist whereby pointers and/or references to data exist. In such an embodiment, if a user has a photo and seeks to recognize a face in the photo, the lightweight metadata would send a request to the source of the metadata (wherever the full version is stored) so that the metadata at the source can be more fully searched. It is recognized that using such a lightweight version may increase the processing time needed (e.g. to receive a response regarding the result of the metadata search, etc.).

In another embodiment, it may be possible to have a separate lightweight version of the metadata such that the basic result of the algorithm (for the individual and the photo, etc.) may be used by other devices without having to fetch all of the data that was used to create the initial results. For example, in one embodiment, the metadata may determine facial characteristics based on ten photos. Such facial characteristics may be shared with other users (but will be limited to the original ten photos associated with the user) and used by other individuals to aid in facial recognition for that individual. A lightweight version of the metadata, therefore, may be a static object based on an initial analysis. In other and most embodiments, however, a dynamic object may be associated with the metadata such that when updates are received from any users (or photos are detected having the recognized face), the metadata may be updated accordingly.

In one embodiment, if a modification is made to metadata, the update may be immediately pushed to other users having media objects relating to the metadata. In this manner, a user may view a media object and while viewing the object, may refresh the object such that updated information associated with the media object (e.g. based on the metadata, etc.) may be displayed.

In a further embodiment, summary metadata may exist which is an average of all of the details of the person. Using such an average may decrease the accuracy of the facial recognition (as it is less precise) but may also decrease the size of the metadata object.

In one embodiment, processing for facial recognition may occur on one or more devices. For example, in one embodiment, processing may be on the device for metadata that is stored on the device. In an optional embodiment, a server may be used to process the metadata to determine facial and/or object recognition.

Figure 8:
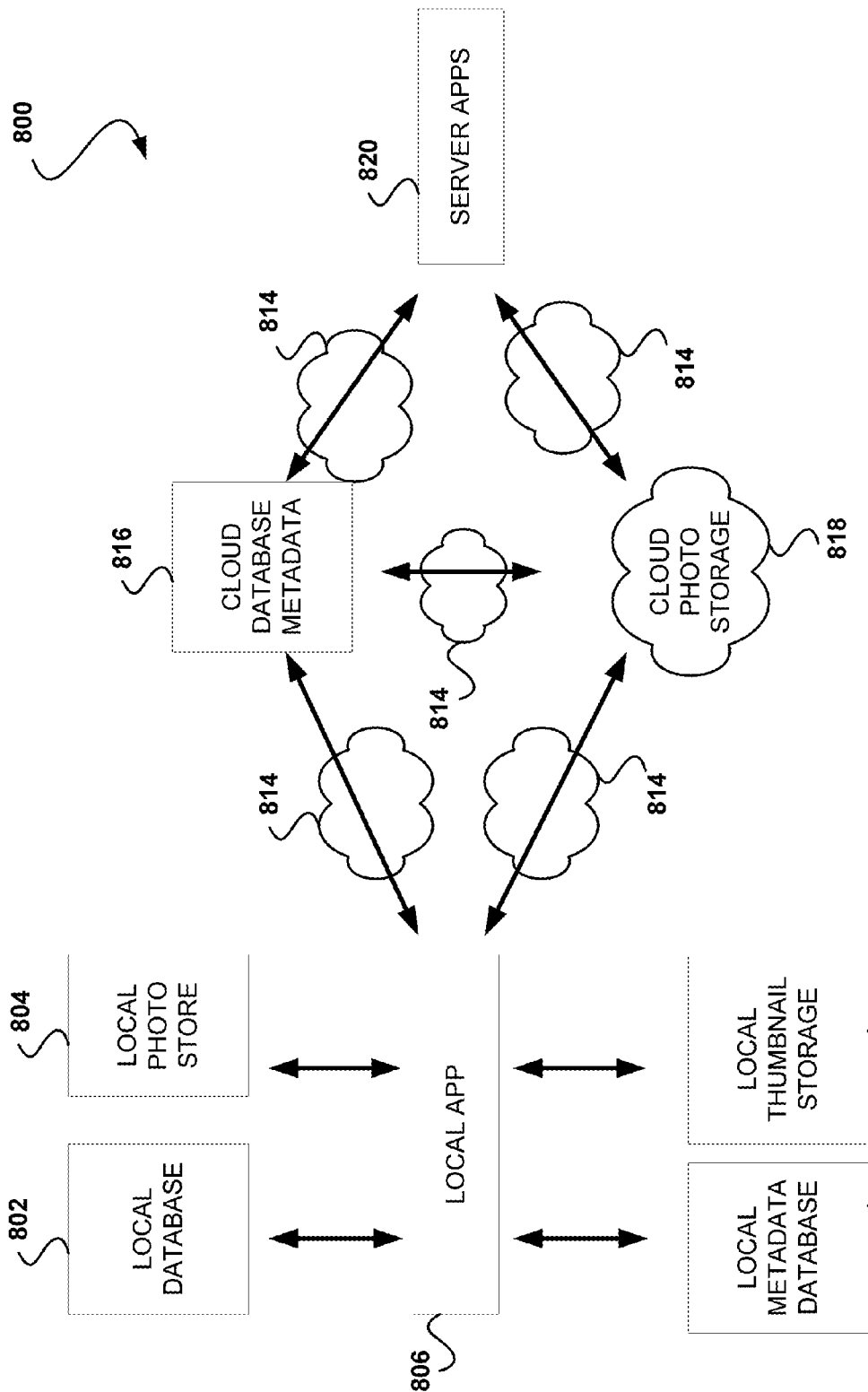
FIG. 8 shows an exemplary system architecture, in accordance with another embodiment.

FIG. 8 shows a system architecture 800, in accordance with another embodiment. As an option, the system architecture 800 may be implemented in the context of the architecture and environment of the previous figures and/or any subsequent figures. Of course, however, the system architecture 800 may be carried out in any desired environment.

As shown, the system architecture 800 includes a local a local app 806 which is connected to a local database 802, a local photo store 804, a local metadata database 808, and a local thumbnail storage 810. Additionally, the local app 806 is connected to a cloud database metadata 816 via network connectivity 814 and/or to cloud photo storage 818 via network connectivity 814. Further, the cloud database metadata 816 may be connected to cloud photo storage 818 via network connectivity 814, and server apps 820 may be connected to cloud database metadata 816 via network connectivity 814 and to cloud photo storage 818 via network connectivity 814.

In one embodiment, interaction may occur between the local database 802 and the local metadata database 808. For example, contact information pulled from the local database 802 may be stored as unique in the local metadata database 808. Additionally, in another embodiment, interaction may occur between the local photo store 804 and the local metadata database 808. For example, photos and metadata may be read from the local photo store 804 and cached in the local metadata database 808. Further, in another embodiment, references (e.g. identifications, etc.) to the photos may be stored as well in the local metadata database 808.

In another embodiment, interaction may occur between the local metadata database 808 and the local thumbnail storage 810, such that metadata associated with identified faces may be stored in the local metadata database 808 and thumbnails associated therewith may be stored in the local thumbnail storage 810. Additionally, in one embodiment, photos may be stored in local photo store 804 and may be pushed to and/or pulled from cloud photo storage 818 via network connectivity 814. In like manner, metadata may be stored in local metadata database 808 and may be pushed to and/or pulled from cloud database metadata 816 via network connectivity 814.

Still yet, in one embodiment, when viewing shared media objects, the list of metadata may be retrieved from cloud database metadata 816, and the list of associated images may be pulled from cloud photo storage 818. In another embodiment, images may be pulled from cached resources located with the server apps 820. Additionally, in one embodiment, when viewing shared media objects, cloud media resources may be stored in local photo store 804. Further, associated metadata may be cached in local metadata database 808.

In some embodiments, a local cache, for example a cache stored in local metadata database 808 may be validated and/or invalidated (e.g. at set time intervals, after a set amount of time, etc.) via network connectivity 814 to cloud database metadata 816. Additionally, in one embodiment, server apps 820 may perform actions on metadata in the cloud database metadata 816 and/or on images found in cloud photo storage 818.

Of course, in one embodiment, local database 802, local photo store 804, local metadata database 808, and local thumbnail storage 810 may all be combined into one logical database (e.g. associated with a single logical database, etc.). In other embodiments, local database 802, local photo store 804, local metadata database 808, and local thumbnail storage 810 may be combined in any manner (e.g. local photo store 804 and local thumbnail storage 810 may be combined on to a single database, local database 802 and local metadata database 808 may be combine on to a single database, etc.).

In one embodiment, syncing may occur between locally stored information (e.g. metadata, photos, thumbnails, etc.) and online resources (e.g. online database metadata, cloud photo storage, etc.). In another embodiment, syncing may occur between many devices and online resources. For example, metadata may be associated with a face identified as USER XYZ. A first user may edit the correlation by correcting some previously identified incorrect textual information. A second user may have 10 more photos relating to USER XYZ which may assist in more accurately recognizing the facial features of USER XYZ. A third user may share a single photo of USER XYZ with a friend who, in turn, has 5 photos relating to USER XYZ which are shared back to third user. In such a scenario, information (e.g. photos, metadata, etc.) from the first user, the second user, the third user, and the friend associated with the third user may all be uploaded to a cloud system. Additionally, such information may be additionally pushed to each of the first user, second user, third user, and/or the friend of the third user, assuming that such information conforms to shared settings.

In this manner, metadata and photos may be shared, updated, and edited, and each user associated with USER XYZ may benefit from the increased accuracy of facial recognition (e.g. based on the additional training and additional photos, etc.). Of course, any number of users may be connected to a cloud system.

In another embodiment, a user may wish not to upload information to a cloud system, but may still seek to share metadata. In such a scenario, the user may share metadata and image data directly from one device to another device (e.g. using a corded connection, using WiFi direct, using Bluetooth, using NFC, etc.). While such a scenario may lack the benefit of using an online system and benefiting from other users' information and training, the system can be modified as desired by each of the individual users.

In one embodiment, any of the techniques disclosed herein may be implemented in a vehicular assembly such as that described in U.S. Pat. No. 8,255,154, which is incorporated herein by reference its entirety. For example, in one embodiment, cameras may be mounted to a vehicular assembly, and object/facial detection may occur in real time. Such a system may benefit from training from other users and, consistent with the embodiments disclosed herewith, also be connected to an online server system such that the vehicular system may benefit from collaboration from other users and systems.

Additionally, any of the techniques disclosed herein may be implemented in a manner consistent with that described explicitly (or by incorporations by reference) in U.S. patent application Ser. No. 14/085,832, filed Nov. 21, 2013, and entitled "SYSTEM, METHOD, AND COMPUTER PROGRAM PRODUCT FOR SHARING METADATA ASSOCIATED WITH A MEDIA OBJECT," which is incorporated herein by reference its entirety.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals.

It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

In one embodiment, each method described above and combinations thereof may be embodied in computer executable code that, when executing on one or more computing devices, performs the acts and/or provides the capabilities thereof. In another embodiment, the methods may be embodied in systems that perform the acts and/or provides the capabilities thereof, and may be distributed across devices in a number of ways, or all of the functionality may be integrated into a dedicated, standalone device or other hardware. In another embodiment, means for performing the steps associated with the processes described above may include any of the hardware and/or software described above. All such permutations and combinations are intended to fall within the scope of the present disclosure.

References in this specification and/or references in specifications incorporated by reference to "one embodiment" may mean that particular aspects, architectures, functions, features, structures, characteristics, etc. of an embodiment that may be described in connection with the embodiment may be included in at least one implementation. Thus, references to "in one embodiment" may not necessarily refer to the same embodiment. The particular aspects etc. may be included in forms other than the particular embodiment described and/or illustrated and all such forms may be encompassed within the scope and claims of the present application. Further, this specification and/or specifications incorporated by reference may refer to a list of alternatives. For example, a first reference such as "A (e.g. B, C, D, E, etc.)" may refer to a list of alternatives to A including (but not limited to) B, C, D, E. A second reference to "A etc." may then be equivalent to the first reference to "A (e.g. B, C, D, E, etc.)." Thus, a reference to "A etc." may be interpreted to mean "A (e.g. B, C, D, E, etc.)."

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:

code for displaying at least a portion of an image including a face, utilizing a touchscreen of a mobile device;

code for receiving a user input in connection with the face utilizing the touchscreen of the mobile device;

code for, after receiving the user input in connection with the face, identifying a plurality of suggested identifiers based on facial recognition utilizing face recognition information that is based on third party input of a third party that is inputted by the third party into at least one other device in association with one or more faces, the face recognition information being received at the mobile device based on a relation between a user of the mobile device and the third party associated with the third party input such that the face recognition information is only received at the mobile device if the relation exists between the user of the mobile device and the third party associated with the third party input, utilizing at least one processor of the mobile device;

code for displaying the suggested identifiers, utilizing the touchscreen of the mobile device;

code for receiving a user input in connection with at least one of the suggested identifiers, utilizing the touchscreen of the mobile device;

code for, after receiving the user input in connection with the at least one suggested identifier, creating a correspondence between the at least one suggested identifier and at least one aspect of the face, utilizing the at least one processor of the mobile device;

code for storing the correspondence in a memory of the mobile device; and code for displaying the at least portion of the image including the face with indicia associated with the at least one suggested identifier based on the correspondence, utilizing the touchscreen of the mobile device.

2. The computer program product as set forth in claim 1, wherein the computer program product is operable such that the suggested identifiers are based on the facial recognition by being identified based on a facial recognition result in connection with the face and facial recognition results involving a plurality of other faces corresponding to the suggested identifiers.

3. The computer program product as set forth in claim 1, wherein the computer program product is operable such that the suggested identifiers are prioritized based on a confidence level associated with facial recognition results involving a plurality of other faces corresponding to the suggested identifiers.

4. The computer program product as set forth in claim 3, wherein the computer program product is operable such that the suggested identifiers are prioritized by ordering the same.

5. The computer program product as set forth in claim 1, wherein the computer program product is operable such that the suggested identifiers are displayed utilizing a scrolling menu.

6. The computer program product as set forth in claim 1, wherein the computer program product is operable such that the suggested identifiers are displayed with a plurality of other faces corresponding to the suggested identifiers.

7. The computer program product as set forth in claim 1, wherein the computer program product is operable such that the plurality of suggested identifiers are also based on contact identifiers stored in a contact database stored in the memory of the mobile device.

8. The computer program product as set forth in claim 1, wherein the computer program product is operable such that the at least portion of the image including the face is displayed after a user input in connection with a training icon displayed in connection with a home screen including a plurality of face icons each representative of at least one corresponding face for accessing images including the at least one corresponding face included therein.

9. The computer program product as set forth in claim 1, wherein the computer program product is operable such that the user input in connection with the face includes an initial touch input in connection with the face utilizing the touchscreen of the mobile device, and a subsequent entry of at least one character for use in filtering the suggested identifiers that are displayed.

10. The computer program product as set forth in claim 1, wherein the computer program product is operable such that receiving the user input in connection with the face includes:
   receiving a first touch input on the face utilizing the touchscreen of the mobile device, the first touch input resulting in a display of a first subset of the suggested identifiers in alphabetical order and a search field;
   after receiving the first touch input, receiving at least one character input in connection with the search field utilizing the touchscreen of the mobile device, the at least one character resulting in a display of a second subset of the suggested identifiers based on the at least one character; and
   after receiving the at least one character input, receiving a second touch input on at least one of the second subset of the suggested identifiers utilizing the touchscreen of the mobile device, the correspondence being created after the second touch input is received.

11. The computer program product as set forth in claim 1, wherein the computer program product is operable such that, prior to receiving the user input in connection with the face, the at least portion of the image including the face is displayed including indicia representative of at least one previous identifier, and the correspondence between the at least one suggested identifier and at least one aspect of the face replaces a pre-existing correspondence between the at least one previous identifier and the at least one aspect of the face.

12. The computer program product as set forth in claim 1, and further comprising:
   code for receiving a user input in connection with another face utilizing the touchscreen of the mobile device, the another face having an associated particular correspondence with a particular identifier;
   code for, after receiving the user input in connection with the another face, retrieving a plurality of alternate identifiers;
   code for displaying the alternate identifiers, utilizing the touchscreen of the mobile device;
   code for receiving a user input in connection with at least one of the alternate identifiers, utilizing the touchscreen of the mobile device;
   code for, after receiving the user input in connection with the at least one alternate identifier, creating an additional correspondence between the at least one alternate identifier and the at least one aspect of the face, utilizing at least one processor of the mobile device;
   code for storing the additional correspondence in the memory of the mobile device; and
   code for displaying the at least portion of the image including the face with indicia associated with the at least one alternative identifier, utilizing the touchscreen of the mobile device.

13. The computer program product as set forth in claim 1, wherein the computer program product is operable such that at least one of:

said user input is received in connection with the face as a result of detecting a touch of a user's finger within a predetermined proximity to the face displayed utilizing the touchscreen of the mobile device;
said user input is received in connection with the at least one suggested identifier as a result of detecting a touch of a user's finger within a predetermined proximity to the at least one suggested identifier displayed utilizing the touchscreen of the mobile device;
said correspondence includes at least one field that correlates the at least one suggested identifier and the at least one aspect of the face;
said at least one aspect of the face includes at least one of a facial identifier associated with the face, a model of the face, or a linkage to information capable of being used to perform facial recognition in connection with the face;
said at least one suggested identifier including at least one of a name, a tag, or an identifier associated with a person corresponding to the face; or
said indicia including a textual representation of the at least one suggested identifier.

14. The computer program product as set forth in claim 1, wherein the computer program product is operable for displaying plurality of faces via a face screen for accessing images including a selected one or more of the faces, and further comprising at least one option for adding one or more new faces to the face screen for accessing images including the one or more new faces upon the selection thereof.

15. The computer program product as set forth in claim 1, wherein the computer program product is operable such that the third party input includes training input that is input on another mobile device for generating the face recognition information that is capable of being used for identifying faces in images.

16. The computer program product as set forth in claim 1, wherein the computer program product is operable such that the relation is established based on an invitation and an acceptance of the invitation.

17. The computer program product as set forth in claim 1, wherein the computer program product is operable such that the relation is established based on a request and a response the request.

18. The computer program product as set forth in claim 1, wherein the computer program product is operable such that the relation is a friend relationship.

19. An apparatus, comprising:
a mobile device configured for:
displaying at least a portion of an image including a face, utilizing a touchscreen of the mobile device;
receiving a user input in connection with the face, utilizing the touchscreen of the mobile device;
after receiving the user input in connection with the face, identifying a plurality of suggested identifiers based on facial recognition utilizing face recognition information that is based on third party input of a third party that is inputted by the third party into at least one other device in association with one or more faces, the face recognition information being received at the mobile device based on a relation between a user of the mobile device and the third party associated with the third party input such that the face recognition information is only received at the mobile device if the relation exists between the user of the mobile device and the third party associated with the third party input;
displaying the suggested identifiers, utilizing the touchscreen of the mobile device;

receiving a user input in connection with at least one of the suggested identifiers, utilizing the touchscreen of the mobile device;

after receiving the user input in connection with the at least one suggested identifier, creating a correspondence between the at least one suggested identifier and at least one aspect of the face, utilizing at least one processor of the mobile device;

storing the correspondence in a memory of the mobile device; and displaying the at least portion of the image including the face with indicia associated with the at least one suggested identifier, utilizing the touchscreen of the mobile device.

20. A method, comprising:

displaying at least a portion of an image including a face, utilizing a touchscreen of a mobile device;

receiving a user input in connection with the face utilizing the touchscreen of the mobile device;

after receiving the user input in connection with the face, identifying a plurality of suggested identifiers based on facial recognition utilizing face recognition information that is based on third party input of a third party that is inputted by the third party into at least one other device in association with one or more faces, the face recognition information being received at the mobile device based on a relation between a user of the mobile device and the third party associated with the third party input such that the face recognition information is only received at the mobile device if the relation exists between the user of the mobile device and the third party associated with the third party input;

displaying the suggested identifiers, utilizing the touchscreen of the mobile device;

receiving a user input in connection with at least one of the suggested identifiers, utilizing the touchscreen of the mobile device;

after receiving the user input in connection with the at least one suggested identifier, creating a correspondence between the at least one suggested identifier and at least one aspect of the face, utilizing at least one processor of the mobile device;

storing the correspondence in a memory of the mobile device; and displaying the at least portion of the image including the face with indicia associated with the at least one suggested identifier, utilizing the touchscreen of the mobile device.

* * * * *